United States Patent [19]
Burshtein

[11] Patent Number: 6,112,325
[45] Date of Patent: Aug. 29, 2000

[54] METHOD AND DEVICE FOR DETECTING RATE

[75] Inventor: David Burshtein, Herzelia, Israel

[73] Assignee: DSPC Technologies, Ltd., Giv'at Shmuel, Israel

[21] Appl. No.: 09/012,338

[22] Filed: Jan. 23, 1998

[51] Int. Cl.[7] .......................... H03M 13/35; H03M 13/41
[52] U.S. Cl. ........................ 714/774; 714/780; 714/795
[58] Field of Search ................... 714/758, 774, 714/776, 780, 789, 794, 795

[56] References Cited

U.S. PATENT DOCUMENTS

| | | | |
|---|---|---|---|
| 5,230,003 | 7/1993 | Dent et al. | 371/43 |
| 5,287,374 | 2/1994 | Parr | 371/43 |
| 5,321,705 | 6/1994 | Gould et al. | 371/43 |
| 5,341,401 | 8/1994 | Farjh et al. | 375/94 |
| 5,509,020 | 4/1996 | Iwakiri et al. | 371/43 |
| 5,537,410 | 7/1996 | Li | 370/84 |
| 5,544,156 | 8/1996 | Teder et al. | 370/18 |
| 5,566,206 | 10/1996 | Butler et al. | 375/225 |
| 5,627,845 | 5/1997 | Asano et al. | 371/43 |
| 5,629,934 | 5/1997 | Ghosh et al. | 370/335 |
| 5,638,408 | 6/1997 | Takaki | 375/341 |
| 5,671,255 | 9/1997 | Wang et al. | 375/341 |
| 5,689,511 | 11/1997 | Shimazaki et al. | 370/545 |
| 5,710,784 | 1/1998 | Kindred et al. | 371/43 |
| 5,757,813 | 5/1998 | Raith | 371/5.5 |
| 5,771,226 | 6/1998 | Kaku | 370/232 |
| 5,796,757 | 8/1998 | Czaja | 371/46 |
| 5,838,697 | 11/1998 | Abe | 371/43.8 |
| 5,872,775 | 2/1999 | Saints et al. | 370/342 |
| 5,878,098 | 3/1999 | Wang et al. | 375/377 |

OTHER PUBLICATIONS

Andrew J. Viterbi, "CDMA—Principles of Spread Spectrum Communication", Addison–Wesley Publishing Company, 1995, pp. 84–92.

Gutierrez, et al., "A ML Rate Detection Algorithm for IS–95 CDMA", IEEE, 1999 (3 pages).

Primary Examiner—Stephen M. Baker
Attorney, Agent, or Firm—Skjerven, Morrill, MacPherson, Franklin & Friel LLP

[57] ABSTRACT

Device for determining the rate of a received communication frame, including a plurality of encoded signal quality estimators, each at a different rate, a decision controller, connected to the encoded signal quality estimators, a decoder connected to the controller and an erasure detection unit connected to the decoder and the controller, wherein each of the quality estimators processes the received encoded frame according to an encoded signal quality criteria, thereby producing a quality value, wherein the controller selects the rate with the best quality value, the decoder decodes the encoded frame according to the selected rate and the erasure detection unit analyzing the decoded frame, thereby determining it as allowed or as erased.

25 Claims, 12 Drawing Sheets

METHOD AND DEVICE FOR DETECTING RATE

FIELD OF THE INVENTION

The present invention relates to a method and system for detecting and determining the data rate of a received signal, in general and to a method and system for providing an appropriate data rate and erasure decision, in particular.

BACKGROUND OF THE INVENTION

In the art, there are known methods and systems for determining the data rate of a received signal. Communication standards often address problems of variable bandwidth due to interference reflections, speech activity controlling and the like, by providing several modes of transmission, each in a predetermined data rate.

The definition of the basic terms used hereinbelow can be found in "*CDMA—principles of spread spectrum communication*", by A. J. Viterbi, Addison-Wesley Publishing Company, 1995.

Reference is now made to FIG. 1 which is a schematic illustrating of a system, referenced 1, known in the art. System 1 receives an incoming signal, which has been transmitted at a rate, selected from a set of rates. In the present example, the rate set includes four rates. The rates are, marked 1, ½, ¼ and ⅛. The maximal volume of information which can be transmitted in rate ½ is half the maximal volume of information which can be transmitted in rate 1. The same applies for rates ¼ and ½, and rates ⅛ and ¼, respectively.

System 1 includes a plurality of decoding and estimating units 2, 4, 6, and 8 for each available rate. Unit 2 includes a decoder 10 and a reception quality estimator 12, which is connected to the decoder 10. Unit 4 includes a decoder 14 and a reception quality estimator 16, which is connected to the decoder 14. Unit 6 includes a decoder 18 and a reception quality estimator 20, which is connected to the decoder 18. Unit 8 includes a decoder 22 and a reception quality estimator 24, which is connected to the decoder 22.

System 1 further includes a decision controller 26 which is connected to units 2, 4, 6 and 8.

The received encoded signal is provided to each of the decoding and estimating units 2, 4, 6, and 8. The decoder 10 decodes the encoded signal according to rate=1 and provides the decoded signal to the reception quality estimator 12. The reception quality estimator 12 processes the decoded signal so as to produce a quality value and provides it to the decision controller 26.

The decoder 14 decodes the encoded signal according to rate=½ and provides the decoded signal to the reception quality estimator 16. The reception quality estimator 16 processes the decoded signal so as to produce a quality value and provides it to the decision controller 26. The same process is executed by units 6 and 8 so as to produce quality values for rates ¼ and ⅛, respectively.

Then, the decision controller 26 selects the rate which has best quality value and informs the receiver that the received encoded signal is to be processed according to the selected rate. Such systems are described in several U.S. patents.

U.S. Pat. No. 5,230,003 to Dent et al describes a method which decodes a received signal according to two rates, thereby producing two decoded samples, provides a quantitative measurement for each of these decoded samples, compares between the quantitative measurements and selects a rate accordingly.

U.S. Pat. No. 5,566,206 to Butler et al describes a method which decodes a received signal according to plurality of rates, re-encodes all of the decoded samples, counts the number of symbol errors, combines quality estimation and selects the rate accordingly.

U.S. Pat. No. 5,671,255 to Mao Wang et al describes a method which decodes a received signal according to a plurality of rates, calculates detection statistic according to several parameters, such as CRC, symbol error rate and the output quality value of the Viterbi decoder and selects a rate accordingly.

U.S. Pat. No. 5,638,408 to Takaki describes a method which decodes a received signal according to a plurality of rates, compares the four path metric values and selects a rate accordingly.

U.S. Pat. No. 5,509,020 to Iwakiri et al describes a method which decodes a received signal according to a plurality of rates, compares the path metric of the decoder at each rate and selects a rate accordingly.

It will be appreciated by those skilled in the art that decoding a received encoded signal according to all possible rates requires a considerable amount of processing power, thereby increasing power consumption. This is extremely crucial in mobile communication systems such as cellular telephones, since these systems have limited power sources.

IS-95 communication standard (CDMA) provides two sets of communication rates. Rate set 1, which includes 1200, 2400, 4800 and 9600 bits per second and rate set 2, which includes 1800, 3600, 7200 and 14400 bits per second.

Each CDMA information frame can be transmitted at any rate in a given rate set. The present example relates to rate set 1. It will be appreciated by those skilled in the art that an IS-95 frame does not include any specific information indicating the rate, according to which it was transmitted.

A receiver receiving this frame has to estimate the correct rate from the received data incorporated therein, in order to correctly decode the information bits, of that frame. According to the standard, the information bits are encoded in a convolutional encoder, having a rate of ½. Then, they are subjected to symbol repetition, depending on the rate.

TABLE 1

| Rate name | ⅛ | ¼ | ½ | 1 |
|---|---|---|---|---|
| $Rate\left[\dfrac{bits}{sec}\right](R)$ | 1200 | 2400 | 4800 | 9600 |
| information bits | 16 | 40 | 80 | 172 |
| CRC bits | 0 | 0 | 8 | 12 |
| encoder tail bits | 8 | 8 | 8 | 8 |
| $N_b\left[\dfrac{bits}{frame}\right]$ | 24 | 48 | 96 | 192 |
| repetitions (rpt) | 8 | 4 | 2 | 1 |
| transmitted symbols $N_s$ | 384 | 384 | 384 | 384 |

As will be appreciated by those skilled in the art, the number of transmitted symbols $N_s$ in each frame is three hundred and eighty four. This number is independent of the rate used for transmitting this frame.

The symbols are arranged in an interleaved format and multiplied first by the user's unique Walsh function, and then by a complex pseudo random (PN) chip sequence. Each symbol is multiplied by sixth four chips, each having a real component $I_c$ and an imaginary component $Q_c$, wherein $I_c$ and $Q_c$ are independent. A complex combination of the real component $I_c$ and the imaginary component $Q_c$, given by $I_c+jQ_c$, represents each chip. The complex output signal, which is a result of the multiplication, is then QPSK modulated and transmitted to the channel.

It will be appreciated by those skilled in the art that although the above method provides reasonable rate detection results, the method includes a tremendous amount of calculating operations. Hence, an implementation of this method in software requires high speed processing capabilities, which results in an increased power consumption. An implementation of this method in hardware requires a great number of hardware elements, which are difficult to manufacture and utilize in small size systems.

SUMMARY OF THE PRESENT INVENTION

It is an object of the present invention to provide a novel method and a novel system for providing a rate detection which overcomes the disadvantages of the prior art.

According to the present invention there is thus provided a rate detection device for incorporating in a receiver, receiving an encoded signal frame. The encoded signal frame is encoded in one of a plurality of rates. The rate detection devices includes a plurality of encoded signal quality estimators, each for processing the encoded signal frame according to a different one of the plurality of rates, thereby producing a quality value for the rate. The device further includes a controller, connected to the encoded signal quality estimators. The controller selects the rate having the best quality value and provides the rate to the receiver.

The rate detection device further includes a decoder connected to the controller for decoding the encoded signal frame according to the selected rate, thereby producing a decoded frame.

According to one aspect of the invention the device also includes an erasure detection unit, connected to the controller and the decoder, operative according to a predetermined erasure criteria, for processing the decoded frame, thereby determining the decoded frame either as allowed or not.

In cases where the encoded frame can include CRC information, the rate detection device further includes a decoded signal quality estimator which is connected before the encoded signal quality estimators, for pre-processing the encoded signal frame according to a predetermined one of the plurality of rates.

The decoded signal quality estimator produces a decoded quality value for the predetermined rate assigned thereto, decodes it and provides the decoded frame to the receiver, when the decoded quality value exceeds a predetermined quality threshold value and there are no CRC errors. The encoded signal quality estimators, process the encoded signal frame, otherwise. Accordingly, the decoded quality value can further include a representation of the presence of CRC errors in the decoded frame.

According to a further aspect of the present invention, there is provided a rate detection device which includes at least one decoded signal quality estimator, connected in series therebetween and further connected to the host. Each decoded signal quality estimator decodes the encoded signal frame at a different rate selected from one of the rate-sets available in the communication standard.

Each decoded signal quality estimator processes the encoded signal frame when the previous one of the decoded signal quality estimators failed to decode the encoded signal frame. Each of the decoded signal quality estimator produces a respective decoded signal quality value.

The device further includes a plurality of encoded signal quality estimators, connected in parallel therebetween and after the decoded signal quality estimators, for processing the encoded signal frame, each at a different rate of the rate-set, thereby producing encoded signal quality values, only after all of the decoded signal quality estimators failed to correctly decode the encoded signal frame.

The rate detection device of the invention further includes a controller connected to the at least one encoded signal quality estimator, a decoder connected to the controller, an erasure detection unit connected to the controller, the decoder and the host. The erasure detection unit operates according to a predetermined erasure criteria.

The controller selects the best of the encoded signal quality values, the decoder decodes the encoded signal frame according to the rate associated with the selected encoded signal quality value, thereby producing a decoded frame. Then, the erasure detection unit provides the decoded frame to the host when determining the decoded frame allowed.

If the erasure detection unit does not allow the frame according to the selected rate, then, the controller selects the next best encoded signal quality value and the device repeats decoding and erasure detecting according to the current rate. This process of selecting the next best rate can be repeated until all of the frame is analyzed according to all of the hypothesis rates.

The erasure detection unit determines the decoded frame as erased after the controller completed repeating the above selecting, a predetermined number of times.

According to yet another aspect of the invention, the rate detection device of the invention further includes a plurality of decoders, connected in series therebetween and further connected to the host, each for decoding the encoded signal frame at a different rate selected from a second one of the rate-sets, available in the communication standard. Each decoder processes the encoded signal frame when the previous decoder in the sequence failed to correctly decoded the encoded signal frame.

The device further includes a rate-set switch connected to the host and before the first of the decoded signal quality estimators and the first one of the decoders. The rate-set switch routes the encoded signal frame according to the first decoded signal quality estimator, when in a mode according to the first rate-set and to the first decoder, when in a mode according to the second rate-set.

According to this aspect, a decoder of the plurality of decoders which succeeds in producing a correctly decoded frame, provides it to the host.

The successes and failure of each the decoders, to decode the encoded signal frame can determined according to an erasure detection criteria.

According to yet a further embodiment of the present invention, adapted for communication standards which provide provides a plurality of rate-sets, there is thus provided a rate detection device which includes a plurality of decoders, connected in series therebetween and further connected to a host, each for decoding the encoded signal frame at a different rate selected from a first one of the rate-sets.

Each encoder analyzes the encoded signal frame when the previous decoder failed to correctly decode the encoded signal frame. The decoder which succeeds in producing a correctly decoded frame, provides the correctly decoded frame to the host.

Each of the above encoded signal quality estimators can processes the encoded signal frame according to an encoded quality criteria which is selected from the group consisting of:

$$l(data) = c_{rate} + \beta \sum_{j=1}^{N_s/rpt} \log\left(\exp\left\{\frac{2\hat{c}}{\hat{\sigma}^2}si(j)\right\} + \exp\left\{\frac{-2\hat{c}}{\hat{\sigma}^2}si(j)\right\}\right);$$

$$l(data) = c_{rate} + \beta \sum_{j=1}^{N_s/rpt} \log\left(\exp\left\{\frac{2\hat{c}}{\hat{\sigma}^2}si(j)\right\} + \exp\left\{\frac{-2\hat{c}}{\hat{\sigma}^2}si(j)\right\}\right) + \overline{\hat{\sigma}_t^2} =$$

$$\overline{\hat{\sigma}_{t-1}^2} \cdot \delta + \hat{\sigma}_t^2 \cdot (1-\delta);$$

$$l(data) = c_{rate} + \sum_{j=1}^{N_s/rpt} \log\left(\exp\left\{\frac{2\hat{c}\beta}{\hat{\sigma}^2}si(j)\right\} + \exp\left\{\frac{-2\hat{c}\beta}{\hat{\sigma}^2}si(j)\right\}\right);$$

$$l(data) = c_{rate} + \sum_{j=1}^{N_s/rpt} \log\left(\exp\left\{\frac{2\hat{c}\beta}{\hat{\sigma}^2}si(j)\right\} + \exp\left\{\frac{-2\hat{c}\beta}{\hat{\sigma}^2}si(j)\right\}\right) + \overline{\hat{\sigma}_t^2} =$$

$$\overline{\hat{\sigma}_{t-1}^2} \cdot \delta + \hat{\sigma}_t^2 \cdot (1-\delta);$$

$$l(data) = -\beta N_s N_f \log(E_u - \hat{c}^2 E_p) + c_{rate};$$

$$l(data) =$$
$$-\beta N_s N_f \log(E_u - \hat{c}^2 E_p) + c_{rate} + \beta \sum_{j=1}^{N_s/rpt} \log\left(1 + \exp\left\{-\left|\frac{4\hat{c}}{\hat{\sigma}^2}si(j)\right|\right\}\right);$$

$$l(data_1, data_2) = K_1 - N_s \log 2/rpt_1 +$$
$$\sum_{j=1}^{N_s/rpt_1} \log\left(\exp\left\{\frac{2c_1}{\sigma^2}si_1(j)\right\} + \exp\left\{\frac{-2c_1}{\sigma^2}si_1(j)\right\}\right) + K_2 -$$
$$N_s \log 2/rpt_2 + \sum_{j=1}^{N_s/rpt_2} \log\left(\exp\left\{\frac{2c_2}{\sigma^2}si_2(j)\right\} + \exp\left\{\frac{-2c_2}{\sigma^2}si_2(j)\right\}\right);$$

$$l(data_1, data_2) = K_1 - N_s \log 2/rpt_1 + \frac{2c_1}{\sigma^2}\sum_{j=1}^{N_s/rpt_1}|si_1(j)| +$$
$$K_2 - N_s \log 2/rpt_2 + \frac{2c_2}{\sigma^2}\sum_{j=1}^{N_s/rpt_2}|si_2(j)|;$$

$$\check{c}_1 = \frac{\sum_{j=1}^{N_s/rpt_1}|si_1(j)| + \gamma\sum_{j=1}^{N_s/rpt_2}|si_2(j)|}{E_{p_1} + \gamma^2 E_{p_2}};$$

$$\check{\sigma} = \sqrt{\frac{1}{2N_s N_f}\left[E_{u_1} + E_{u_2} - (E_{p_1} + \gamma^2 E_{p_2})\check{c}_1^2\right]};$$

$$l(data_1, data_2) =$$
$$-2N_s N_f \log\left[E_{u_1} + E_{u_2} - \check{c}_1^2(E_{p_1} + \gamma^2 E_{p_2})\right] - \frac{N_s}{rpt_1}\log 2 - \frac{N_s}{rpt_2}\log 2;$$

$$l(data_1, data_2) =$$
$$-\beta N_s N_f \log\left[E_{u_1} + E_{u_2} - \check{c}_1^2(E_{p_1} + \gamma^2 E_{p_2})\right] + c_{rate_1} + c_{rate_2};$$

$$l(data_1, data_2) = -\beta N_s N_f \log\left[E_{u_1} + E_{u_2} - \check{c}_1^2(E_{p_1} + \gamma^2 E_{p_2})\right] +$$
$$c_{rate_1} + c_{rate_2} + \beta\sum_{j=1}^{N_s/rpt}\log\left(1 + \exp\left\{-\left|\frac{4\check{c}_1}{\check{\sigma}^2}si_1(j)\right|\right\}\right) +$$

-continued $$\beta\sum_{j=1}^{N_s/rpt}\log\left(1 + \exp\left\{-\left|\frac{4\check{c}_2}{\check{\sigma}^2}si_2(j)\right|\right\}\right); \text{ and}$$

$$a_j = \max_i\{\rho\hat{a}_i + (1-\rho)l_{ij}(data)\}.$$

The erasure criteria is selected from the group, consisting of CRC information, symbol error rate and accumulated Viterbi metric.

In accordance with a further aspect of the present invention, there is thus provided a method for a method for detecting the rate. The method includes the steps of:

processing an encoded signal according to at least two rates, in a given rate-set, thereby producing an encoded signal quality value for each of the rates, selecting the best of the encoded signal quality values, selecting the rate associated with the selected encoded signal quality value.

decoding the encoded frame according to the selected rate, processing the decoded frame according to a predetermined erasure criteria, thereby determining the decoded frame either as allowed or as rejected, selecting the next best of the encoded signal quality values, when rejecting the decoded frame (in IS-95 determining a frame as erased), selecting the rate associated with the selected next best encoded signal quality value, and repeating from the step of decoding the encoded frame according to the selected rate.

When the standard defines the some rates of at least one of the rate-sets, as including CRC information, the method includes the steps of:

processing the encoded frame at a elected rate of the plurality of these rates, thereby producing a decoded signal rate quality value, repeating the step of processing for another elected one of these rates, when failing to correctly decode the encoded frame or when the quality value does not exceed a predetermined threshold value.

For the rates which do not include CRC information as well as for frames of CRC associated rates, which may further be used even if including some errors, the method further includes the steps of:

processing the encoded signal according to a plurality of rates, thereby producing an encoded signal quality value for each of the rates, when failing to correctly decode the encoded frame at selected rates of the above CRC associated rates, selecting the best of the encoded signal quality value, and selecting the rate associated with the selected encoded signal quality value.

decoding the encoded frame according to the selected rate, and processing the decoded frame according to a predetermined erasure criteria, thereby determining the decoded frame either as allowed or as rejected.

Accordingly, similar to the previous method, the process can be repeated for the next best of the encoded signal quality values, when rejecting the decoded frame, according to the current selected value.

The present invention undertakes a further novel approach to rate detection, where it utilizes the user data power of a received frame in the process of detecting the correct rate.

The encoded signal quality value, used in the above methods of the invention is calculated, for example, according to a quality criteria, selected from the group consisting of:

$$l(data) = c_{rate} + \beta \sum_{j=1}^{N_s/rpt} \log\left(\exp\left\{\frac{2\hat{c}}{\hat{\sigma}^2}si(j)\right\} + \exp\left\{\frac{-2\hat{c}}{\hat{\sigma}^2}si(j)\right\}\right);$$

$$l(data) = c_{rate} + \beta \sum_{j=1}^{N_s/rpt} \log\left(\exp\left\{\frac{2\hat{c}}{\hat{\sigma}^2}si(j)\right\} + \exp\left\{\frac{-2\hat{c}}{\hat{\sigma}^2}si(j)\right\}\right) + \overline{\hat{\sigma}_t^2} =$$

$$\overline{\hat{\sigma}_{t-1}^2}\cdot\delta + \hat{\sigma}_t^2\cdot(1-\delta);$$

$$l(data) = c_{rate} + \sum_{j=1}^{N_s/rpt} \log\left(\exp\left\{\frac{2\hat{c}\beta}{\hat{\sigma}^2}si(j)\right\} + \exp\left\{\frac{-2\hat{c}\beta}{\hat{\sigma}^2}si(j)\right\}\right);$$

$$l(data) = c_{rate} + \sum_{j=1}^{N_s/rpt} \log\left(\exp\left\{\frac{2\hat{c}\beta}{\hat{\sigma}^2}si(j)\right\} + \exp\left\{\frac{-2\hat{c}\beta}{\hat{\sigma}^2}si(j)\right\}\right) + \overline{\hat{\sigma}_t^2} =$$

$$\overline{\hat{\sigma}_{t-1}^2}\cdot\delta + \hat{\sigma}_t^2\cdot(1-\delta);$$

$$l(data) = -\beta N_s N_f \log(E_u - \hat{c}^2 E_p) + c_{rate};$$

$$l(data) =$$
$$-\beta N_s N_f \log(E_u - \hat{c}^2 E_p) + c_{rate} + \beta \sum_{j=1}^{N_s/rpt} \log\left(1 + \exp\left\{-\left|\frac{4\hat{c}}{\hat{\sigma}^2}si(j)\right|\right\}\right);$$

$$l(data_1, data_2) = K_1 - N_s \log 2/rpt_1 +$$
$$\sum_{j=1}^{N_s/rpt_1} \log\left(\exp\left\{\frac{2c_1}{\sigma^2}si_1(j)\right\} + \exp\left\{\frac{-2c_1}{\sigma^2}si_1(j)\right\}\right) + K_2 -$$
$$N_s \log 2/rpt_2 + \sum_{j=1}^{N_s/rpt_2} \log\left(\exp\left\{\frac{2c_2}{\sigma^2}si_2(j)\right\} + \exp\left\{\frac{-2c_2}{\sigma^2}si_2(j)\right\}\right);$$

$$l(data_1, data_2) = K_1 - N_s \log 2/rpt_1 + \frac{2c_1}{\sigma^2}\sum_{j=1}^{N_s/rpt_1}|si_1(j)| +$$
$$K_2 - N_s \log 2/rpt_2 + \frac{2c_2}{\sigma^2}\sum_{j=1}^{N_s/rpt_2}|si_2(j)|;$$

$$\breve{c}_1 = \frac{\sum_{j=1}^{N_s/rpt_1}|si_1(j)| + \gamma\sum_{j=1}^{N_s/rpt_2}|si_2(j)|}{E_{p_1} + \gamma^2 E_{p_2}};$$

$$\breve{\sigma} = \sqrt{\frac{1}{2N_s N_f}\left[E_{u_1} + E_{u_2} - (E_{p_1} + \gamma^2 E_{p_2})\breve{c}_1^2\right]};$$

$$l(data_1, data_2) =$$
$$-2N_s N_f \log\left[E_{u_1} + E_{u_2} - \breve{c}_1^2(E_{p_1} + \gamma^2 E_{p_2})\right] - \frac{N_s}{rpt_1}\log 2 - \frac{N_s}{rpt_2}\log 2;$$

$$l(data_1, data_2) =$$
$$-\beta N_s N_f \log\left[E_{u_1} + E_{u_2} - \breve{c}_1^2(E_{p_1} + \gamma^2 E_{p_2})\right] + c_{rate_1} + c_{rate_2};$$

$$l(data_1, data_2) = -\beta N_s N_f \log\left[E_{u_1} + E_{u_2} - \breve{c}_1^2(E_{p_1} + \gamma^2 E_{p_2})\right] +$$
$$c_{rate_1} + c_{rate_2} + \beta\sum_{j=1}^{N_s/rpt}\log\left(1 + \exp\left\{-\left|\frac{4\breve{c}_1}{\breve{\sigma}^2}si_1(j)\right|\right\}\right) +$$

-continued $$\beta\sum_{j=1}^{N_s/rpt}\log\left(1 + \exp\left\{-\left|\frac{4\breve{c}_2}{\breve{\sigma}^2}si_2(j)\right|\right\}\right); \text{ and}$$

$$a_j = \max_i\{\rho\hat{a}_i + (1-\rho)l_{ij}(data)\}.$$

Some communication standards, define the user data power to be different, at different rates. Accordingly, when comparing the user data power of a received frame with respect to other types of data in that frame as well as to user data power detected for previously received frames, one can determine the rate of the received frame, therefrom.

Accordingly, in accordance with another aspect of the invention, there is provided a method which includes the steps of:

analyzing the received encoded frame at a plurality of rates, thereby producing a user data power associated quality values therefrom, selecting the best of the user data power associated quality value, and selecting the rate associated with the selected user data power associated quality value.

The step of analyzing can further include comparing the user data power of the encoded frame with user data power of previous analyzed frames, as well as with respect to the rate determined for the previous analyzed frame.

The method can further include the steps of:

decoding the encoded frame according to the selected rate, processing the decoded frame according to a predetermined erasure criteria, thereby determining the decoded frame either as allowed or as rejected, selecting the next best of the encoded signal quality values, when rejecting the decoded frame, selecting the rate associated with the selected next best encoded signal quality value, and repeating from the step of decoding the encoded frame according to the selected rate.

The failing to correctly decode the encoded frame is determined according to an erasure criteria, which can be selected from the group, consisting of:

CRC information;

symbol error rate; and accumulated Viterbi metric.

The encoded signal quality value, used in the above methods of the invention is calculated, for example, according to a quality criteria, selected from the group consisting of:

$$l(data_1, data_2) =$$
$$K_1 - N_s\log 2/rpt_1 + \sum_{j=1}^{N_s/rpt_1}\log\left(\exp\left\{\frac{2c_1}{\sigma^2}si_1(j)\right\} + \exp\left\{\frac{-2c_1}{\sigma^2}si_1(j)\right\}\right) +$$
$$K_2 - N_s\log 2/rpt_2 + \sum_{j=1}^{N_s/rpt_2}\log\left(\exp\left\{\frac{2c_2}{\sigma^2}si_2(j)\right\} + \exp\left\{\frac{-2c_2}{\sigma^2}si_2(j)\right\}\right);$$

$$l(data_1, data_2) = K_1 - N_s\log 2/rpt_1 + \frac{2c_1}{\sigma^2}\sum_{j=1}^{N_s/rpt_1}|si_1(j)| +$$

-continued $$K_2 - N_s \log 2 / rpt_2 + \frac{2c_2}{\sigma^2} \sum_{j=1}^{N_s/rpt_2} |si_2(j)|;$$

$$\breve{c}_1 = \frac{\sum_{j=1}^{N_s/rpt_1} |si_1(j)| + \gamma \sum_{j=1}^{N_s/rpt_2} |si_2(j)|}{E_{p_1} + \gamma^2 E_{p_2}};$$

$$\breve{\sigma} = \sqrt{\frac{1}{2N_s N_f} \left[ E_{u_1} + E_{u_2} - (E_{p_1} + \gamma^2 E_{p_2}) \breve{c}_1^2 \right]};$$

$l(data_1, data_2) =$ $$-2N_s N_f \log[E_{u_1} + E_{u_2} - \breve{c}_1^2 (E_{p_1} + \gamma^2 E_{p_2})] - \frac{N_s}{rpt_1} \log 2 - \frac{N_s}{rpt_2} \log 2;$$

$l(data_1, data_2) =$ $$-\beta N_s N_f \log[E_{u_1} + E_{u_2} - \breve{c}_1^2 (E_{p_1} + \gamma^2 E_{p_2})] + c_{rate_1} + c_{rate_2};$$

$$l(data_1, data_2) = -\beta N_s N_f \log[E_{u_1} + E_{u_2} - \breve{c}_1^2 (E_{p_1} + \gamma^2 E_{p_2})] +$$

$$c_{rate_1} + c_{rate_2} + \beta \sum_{j=1}^{N_s/rpt} \log\left(1 + \exp\left\{-\left|\frac{4\breve{c}_1}{\breve{\sigma}^2} si_1(j)\right|\right\}\right) +$$

$$\beta \sum_{j=1}^{N_s/rpt} \log\left(1 + \exp\left\{-\left|\frac{4\breve{c}_2}{\breve{\sigma}^2} si_2(j)\right|\right\}\right); \text{ and}$$

$$a_j = \max_i \{\rho \hat{a}_i + (1 - \rho) l_{ij}(data)\}.$$

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
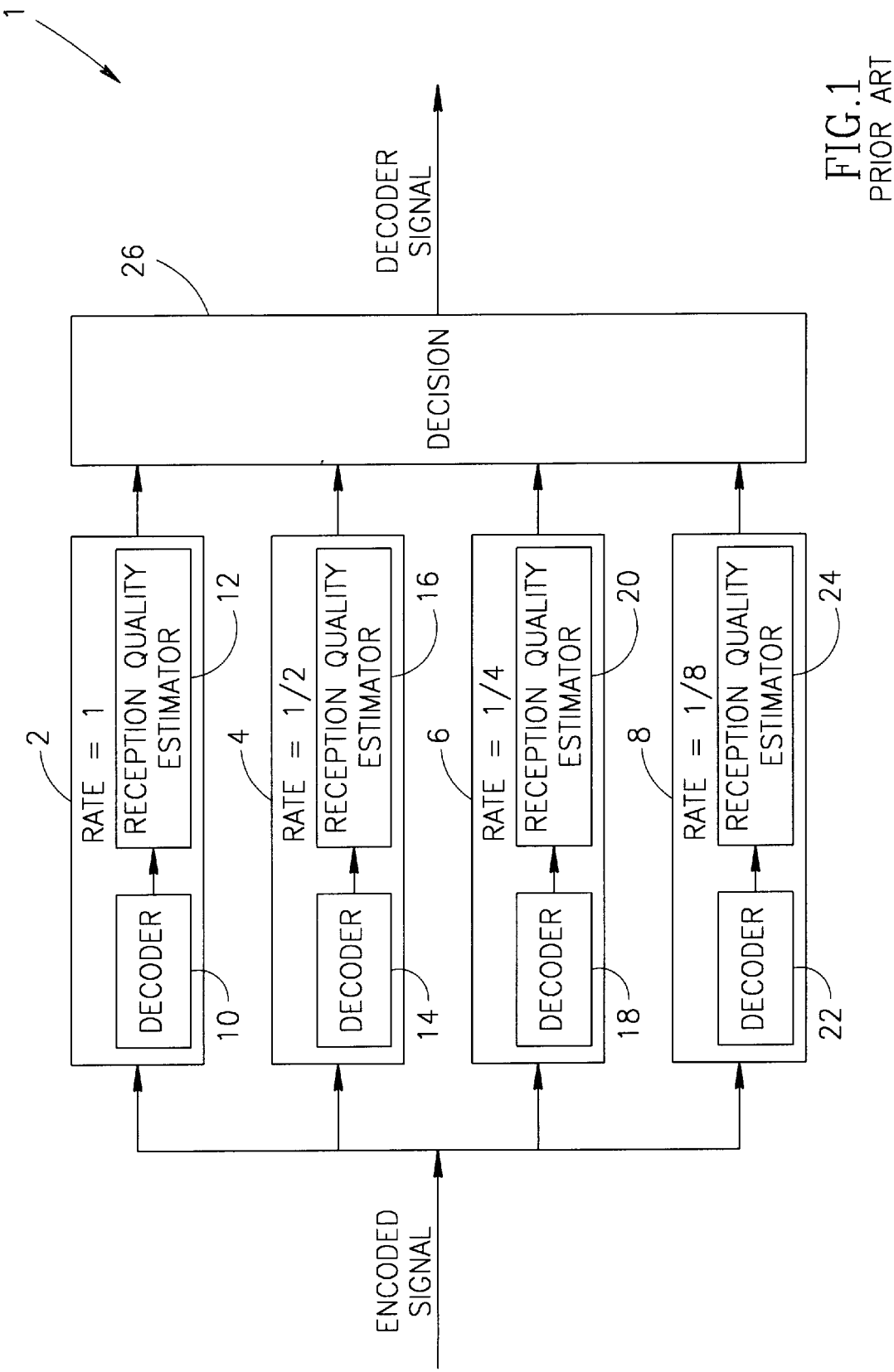
FIG. 1 is a schematic illustrating of a rate detection system, known in the art.

The method of the present invention overcomes the disadvantages of the prior art, by providing a encoded signal likelihood estimating mechanism which reduces and often eliminates the need to decode a signal before attempting to detect its rate.

The method of the present invention provides several simplified rate and erasure decision criteria. The method of the present invention also provides an erasure criterion, which is based on CRC information and on symbol error rate or on accumulated Viterbi metric, or on a combination of the above.

The definition of the basic terms used hereinbelow can be found in "*CDMA—principles of spread spectrum communication*", by A. J. Viterbi (publ—Addision-Wesley Publishing Company 1995.

i is the index of a transmitted symbol, j is the index of a transmitted chip within that symbol, n is the index of a user, and t is a time variable.

Accordingly, walsh,(j) is the value of the Walsh function (a more precise notation is $walsh_n(j)$; for simplicity the n subscript is omitted), pn(64·i+j) is the complex PN chip, sym(i) is the symbol transmitted (more precisely, $sym_n$ (i)), and s(·) is the pulse shaping signal.

Hence, tx(t,i,j) (more precisely, $tx_n(t,i,j)$), the contribution of the j-th chip of the i-th symbol, transmitted to the n-th user, to the transmitted base-band signal, is given by, $$tx(t,i,j) = c \cdot sym(i) \cdot walsh(j) \cdot pn(64 \cdot i+j) \cdot s(t-(64 \cdot i+j)T_c)$$

where $T_c$ is the chip duration.

Similarly, the corresponding contribution to the base-band pilot signal, is given by $$tx_0(t,i,j) = pn(64 \cdot i+j) \cdot s(t-(64 \cdot i+j)T_c)$$

where c is the ratio of the user-data signal amplitude to the pilot signal amplitude. Hence, for each finger f, the contribution of the j-th chip of the transmitted i-th symbol to the received user and pilot base-band signals, r(t,f,i,j), and $r_o(t,f,i,j)$ are given by $$r(t,f,i,j) = tx(t,i,j) \cdot A e^{i\phi}$$

$$r_0(t,f,i,j) = tx_0(t,i,j) \cdot A e^{i\phi}$$

wherein A is the amplitude of the finger and φ is the phase. This method assumes that any additional delay in the finger is known, and hence, can be neglected.

At the receiver end, the user and pilot signals are first processed by the matched filter, and then sampled appropriately. Then, the receiver de-interleaves the resulting samples, multiplies both by the conjugate of the PN sequence and then, multiplies the user signal also by its Walsh chip sequence. Finally, the receiver integrates by way of summation, the chips of the symbol. The resulting signals, d(f,i) and $d_0(f,i)$ are given by, $$d(f, i) = \sum_{j=1}^{64} r^M(t, f, i, j) \cdot walsh(j) \cdot pn^*(64 \cdot i + j) + n(f, i) =$$

$$c \cdot A_1 sym(i) \cdot e^{j\phi} + n(f, i)$$

$$d_0(f, i) = \sum_{j=1}^{64} r_0^M(t, f, i, j) \cdot pn^*(64 \cdot i + j) = A_1 \cdot e^{j\phi}$$

wherein * denotes a complex conjugate operator, $r^M(t,f,i,j)$ and $r_0^M(t,f,i,j)$ denote the sampled user and pilot matched filter outputs and $A_1=128$ $A \cdot n(f,i)$ is an additive noise term (contributed by signals transmitted to other users by the same transmitter, other transmitters and also by channel noise) which is dependent of the finger f.

The method assumes that the variance $\sigma^2$ of $n(f,i)$ is independent of the finger f. It is noted that $d_0(f,i)$ does not include an additive noise term due to channel tracking (smoothing) operation that is assumed present.

Based on the given measurement data, $d(f,i)$ and $d_0(f,i)$, of the current frame, the receiver detects the encoded information bits. The rate decision problem is how to make a reliable detection of the rate, according to which the information bits were encoded.

The erasure detection problem is how to make a reliable decision whether the decoded information bits are free of errors. The method of the invention determines a frame as erased, when the output metric of the Viterbi decoder exceeds a predetermined value or when the frame includes more than a predetermined number of errors, or a combination of the above.

According to one aspect of the present invention there is provided a method for estimating a bit sequence, which is operative under the assumption that the transmission rate is unknown.

Further to the definitions made hereinabove, $N_f$ is the number of fingers, bits is the bit sequence encoded at the convolutional encoder of the n-th user, which corresponds to a hypothesis of a selected rate, l(data) is the log likelihood of the data, and l(data|syms) is the a-posterior log- likelihood given an hypothesized symbol sequence syms.

rpt is the symbol repetition factor, i.e.

$$sym(rpt \cdot (j-1)) = sym(rpt \cdot (j-1)+2) = \ldots = sym(rpt \cdot j)$$

(for rotational simplicity we assume that de-interleaving has already been applied on the receiver symbols).

According to another aspect of the present invention, there are provided several signal rate decision criteria, which determine the rate based on l(data), under the assumption that coding is not present. These criteria are based on the following derivation:

$$l(data \mid syms) = \frac{-1}{\sigma^2} \sum_{f=1}^{N_f} \sum_{i=1}^{N_s} |d(f, i) - c \cdot d_0(f, i) \cdot sym(i)|^2 - \quad \text{Equation 1}$$

$$2N_s N_f \log(\sqrt{\pi} \sigma)$$

$$= \frac{2c}{\sigma^2} v(syms) + K$$

where $$v(syms) = \sum_{i=1}^{N_s} \sum_{f=1}^{N_f} \text{Re}\{d(f, i)d_0^*(f, i)\} sym(i) = \sum_{j=1}^{N_s/rpt} si(j) sym(rpt \cdot j)$$

$$s(i) = \sum_{i=rpt \cdot (j-1)+1}^{rpt \cdot j} \sum_{f=1}^{N_f} \text{Re}\{d(f, i)d_0^*(f, i)\}$$

$$K = -\frac{1}{\sigma^2}(E_u + c^2 E_p) - 2N_s N_f \log(\sqrt{\pi} \sigma) \quad \text{Equation 2}$$

$$E_u = \sum_{f=1}^{N_f} \sum_{i=1}^{N_s} |d(f, i)|^2 \quad E_p = \sum_{f=1}^{N_f} \sum_{i=1}^{N_s} |d_0(f, i)|^2$$

The likelihood of the symbol sequence syms is:

$$l(syms) = \log\left(\frac{1}{2}\right)^{N_s/rpt} = -N_s \log 2 / rpt.$$

Hence, $$l(data) = \log \sum_{syms} e^{l(data|syms)} e^{l(syms)} = K - \frac{N_s}{rpt} \log 2 + \log \sum_{syms} e^{2cv(syms)/\sigma^2}$$

$$= K - \frac{N_s}{rpt} \log 2 + \log \sum_{syms} \exp\left\{\frac{2c}{\sigma^2} \sum_{j=1}^{N_s/rpt} si(j)(rpt \cdot i)\right\}$$

The summation over syms denotes a summation over all symbol sequences. Using some straight-forward algebraic manipulations the following expression is obtained, $$l(data) = \quad \text{Equation 3}$$

$$K - N_s \log 2 / rpt + \sum_{j=1}^{N_s/rpt} \log\left(\exp\left\{\frac{2c}{\sigma^2} si(j)\right\} + \exp\left\{\frac{-2c}{\sigma^2} si(j)\right\}\right)$$

The second term $-N_s \log 2/rpt$ on the right hand side (RHS) tends to increase as rpt increases, while the third term on the RHS $$\sum_{j=1}^{N_s/rpt} \log\left(\exp\left\{\frac{2c}{\sigma^2} si(j)\right\} + \exp\left\{\frac{-2c}{\sigma^2} si(j)\right\}\right),$$

monotonically decreases as rpt increases.

To avoid underflows, the last term on the right-hand side of the equation is calculated using, $$\log(e^x + e^{-x}) = \begin{cases} +x + \log(1 + e^{-2x}) & \text{if } x > 0 \\ -x + \log(1 + e^{+2x}) & \text{if } x < 0 \end{cases} = |x| + \log(1 + e^{-2|x|})$$

It will be noted that both c and $\sigma$ should be estimated from the given data. To estimate c and $\sigma$ the method provides a ML estimation procedure for the case where neither coding nor repetition are exploited. In this case the likelihood of the data given the symbols is given by $$l(data \mid syms) = \quad \text{Equation 4}$$

$$\frac{-1}{\sigma^2} \sum_{f=1}^{N_f} \sum_{i=1}^{N_s} |d(f, i) - c \cdot d_0(f, i) \cdot sym(i)|^2 - 2N_s N_f \log(\sqrt{\pi}\,\sigma)$$

Hence, the ML estimate of sym(i), which is denoted by $\overline{sym(i)}$ is given by $$\overline{sym(i)} = \arg\max_{\{sym(i)\}} \sum_{f=1}^{N_f} \text{Re}\{d(f, i) d_0^*(f, i)\} sym(i)$$

(since c>0). Hence, $$\overline{sym(i)} = \text{sign} \sum_{f=1}^{N_f} \text{Re}\{d(f, i) d_0^*(f, i)\} \quad \text{Equation 5}$$

The ML estimate of c($\hat{c}$) is obtained by optimizing Equation 4 with respect to c (i.e., setting the respective derivative to 0), and by invoking Equation 5. Using straight-forward algebraic manipulations we obtain, $$\hat{c} = \frac{\sum_{i=1}^{N_s} \left| \sum_{f=1}^{N_f} \text{Re}\{d(f, i) d_0^*(f, i)\} \right|}{\sum_{i=1}^{N_s} \sum_{f=1}^{N_f} |d_0(f, i)|^2} \quad \text{Equation 6}$$

Similarly, $\hat{\sigma}$, which is the ML estimated value of $\sigma$, is obtained by optimizing Equation 4 with respect to $\sigma$ (i.e., setting the respective derivative to 0). Accordingly, $$\hat{\sigma} = \sqrt{\frac{1}{N_s N_f} \left\{ \sum_{i=1}^{N_s} \sum_{f=1}^{N_f} |d(f, i)|^2 - \hat{c}^2 \sum_{i=1}^{N_s} \sum_{f=1}^{N_f} |d_0(f, i)|^2 \right\}} \quad \text{Equation 7}$$

According to a further aspect of the present invention there are provided generalized signal rate detection criteria, using Equation 3 (note that K is independent of the rate, since the estimates of c and $\sigma$ are independent of the rate. Hence, K may be ignored, i.e. it may be set to 0) to determine the rate.

For example, l(data) can be calculated according to either of the following expressions:

$$l(data) = c_{rate} + \beta \sum_{j=1}^{N_s/rpt} \log\left( \exp\left\{ \frac{2\hat{c}}{\hat{\sigma}^2} si(j) \right\} + \exp\left\{ \frac{-2\hat{c}}{\hat{\sigma}^2} si(j) \right\} \right), \quad \text{Equation 8}$$

and $$l(data) = c_{rate} + \sum_{j=1}^{N_s/rpt} \log\left( \exp\left\{ \frac{2\hat{c}\beta}{\hat{\sigma}^2} si(j) \right\} + \exp\left\{ \frac{-2\hat{c}\beta}{\hat{\sigma}^2} si(j) \right\} \right). \quad \text{Equation 9}$$

where $\beta$ is a parameter of the method.

$c_{rate}$ is generally a constant which is dependent on the rate, for example:

$$c_{rate} = -N_s \log 2 / rpt.$$

Accordingly, $$l(data) = -N_s \log 2 / rpt + \quad \text{Equation 10}$$

$$\beta \sum_{j=1}^{N_s/rpt} \log\left( \exp\left\{ \frac{2\hat{c}}{\hat{\sigma}^2} si(j) \right\} + \exp\left\{ \frac{-2\hat{c}}{\hat{\sigma}^2} si(j) \right\} \right)$$

or $$l(data) = -N_s \log 2 / rpt + \quad \text{Equation 11}$$

$$\sum_{j=1}^{N_s/rpt} \log\left( \exp\left\{ \frac{2\hat{c}\beta}{\hat{\sigma}^2} si(j) \right\} + \exp\left\{ \frac{-2\hat{c}\beta}{\hat{\sigma}^2} si(j) \right\} \right)$$

According to a further aspect of the present invention, there is provided a method for smoothing $\sigma$, which is the ML estimated value of $\sigma$, given in Equation 7, by calculating an average value across the current and previous frames. For example:

$$\tilde{\sigma}_t^2 = \tilde{\sigma}_{t-1}^2 \cdot \delta + \hat{\sigma}_t^2 \cdot (1-\delta) \quad \text{Equation 12}$$

wherein $0 \leq \delta < 1$

To develop the following methods, we invoke an approximation, $\log(e^x + e^{-x}) \cong |x|$ in Equation 3 to obtain, $$l(data) = K - N_s \log 2 / rpt + \frac{2c}{\sigma^2} \sum_{j=1}^{N_s/rpt} |si(j)| \quad \text{Equation 13}$$

where K is given by Equation 2. Optimizing Equation 13 with respect to c and $\sigma$ (i.e., setting the respective derivatives to 0), yields, $$\tilde{c} = \frac{\sum_{j=1}^{N_s/rpt} |si(j)|}{E_p} \qquad \tilde{\sigma} = \sqrt{\frac{1}{N_s N_f}(E_u - \tilde{c}^2 E_p)} \quad \text{Equation 14}$$

where $$E_u = \sum_{f=1}^{N_f} \sum_{i=1}^{N_s} |d(f, i)|^2$$

and $$E_p = \sum_{f=1}^{N_f} \sum_{i=1}^{N_s} |d_0(f, i)|^2.$$

Substituting Equation 14 back into Equation 13 yields (up to a constant additive term)

$$l(data) = -N_s N_f \log(E_u - \tilde{c}^2 E_p) - \frac{N_s \log 2}{rpt}. \quad \text{Equation 15}$$

According to another aspect of the invention, Equation 14 and Equation 15 are used to determine the rate. In order to enable more flexibility the present invention provides the following expression:

$$l(data) = -\gamma N_s N_f \log(E_u - \tilde{c}^2 E_p) + c_{rate}. \quad \text{Equation 16}$$

$c_{rate}$ is a constant which is dependent on the rate, for example, $$c_{rate} = -\frac{N_s \log 2}{rpt}.$$

Hence, $$l(data) = -\beta N_s N_f \log(E_u - \tilde{c}^2 E_p) - \frac{N_s \log 2}{rpt}$$

where $\beta$ is a parameter of the method.

Note that according to another aspect of the invention, l(data) can be computed using Equation 16. Then, the resulting value is corrected by adding a correction term, $$\beta \sum_{j=1}^{N_s/rpt} \log\left(1 + \exp\left\{-\left|\frac{4\tilde{c}}{\tilde{\sigma}^2} si(j)\right|\right\}\right) \quad \text{Equation 17}$$

which is the difference between Equation 3 and Equation 13.

According to another aspect of the invention, the rate can be evaluated by incorporating user-data power information. According to CDMA standard IS-95, the rate assigned to a particular frame, determines the amplitude of the user-data in that frame.

Whenever the rate increases, user-data power increases by the same amount, so as to keep the energy of a transmitted information bit constant. The power of the pilot signal does not change as the rate changes.

Hence, the present invention provides a method in which the power of the user-data in each frame is incorporated in the rate detection criteria, so as to determine the rate of that frame.

Figure 2A:
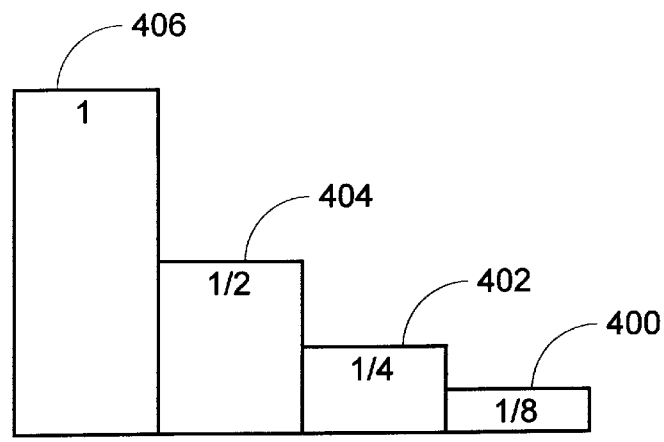
FIGS. 2A and 2B which are schematic illustrations of the power of user-data signal in CDMA frames.
Figure 2B:
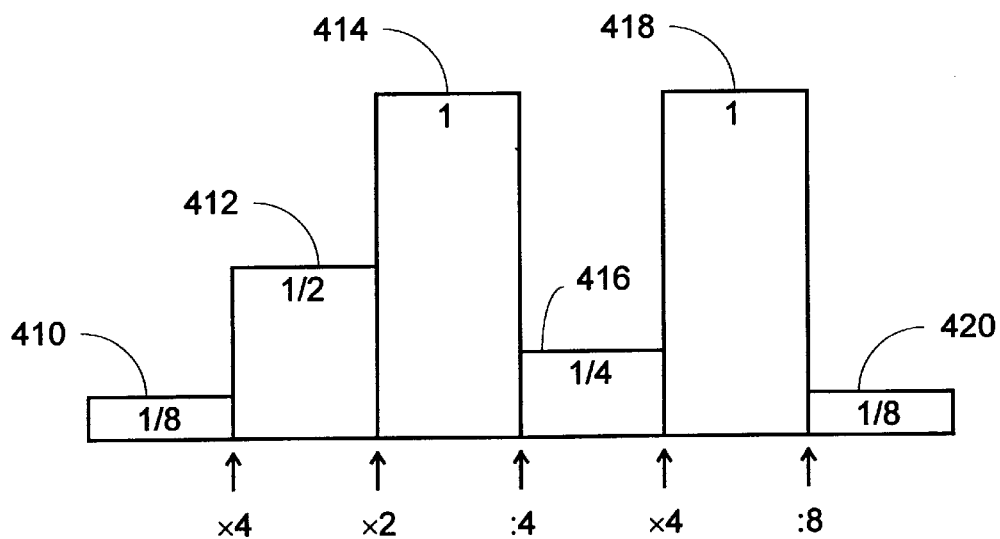

Reference is now made to FIGS. 2A and 2B which are schematic illustrations of the power of user-data signal in CDMA frames.

In FIG. 2A, bars 400, 402, 404 and 406, represent the power of the user-data in ⅛, ¼, ½ and full rate frames, respectively. The power 406 of a full rate frame is twice the power 404 of the user-data of a half rate frame, four times the power 402 of the user-data of a ¼ rate frame and eight times the power 400 of the user-data of a ⅛ rate frame.

According to one aspect of the invention, the user-data power of each frame is scaled according to the user-data power of the previous frame. Referring now to FIG. 2B, the transition from an ⅛ rate frame 410 to a ½ rate frame 412 yields in a ×4 power ratio (i.e., $$\frac{c_2}{c_1} = 4$$

wherein $c_1$ is the power of a selected frame and $c_2$ is the power of the next frame.

Accordingly, the transition from frame 412 to frame 414 yields a ×2 power ratio, the transition from frame 414 to frame 416 yields a :4 power ratio, the transition from frame 416 to frame 418 yields a ×4 power ratio and the transition from frame 418 to frame 420 yields a :8 power ratio.

It will be appreciated that if $A_1$ and $P_1$ are the amplitude and power of a first frame, respectively and $A_2$ and $P_2$ are the amplitude and power of a second frame, respectively, then, $$\frac{A_1}{A_2} = \left(\frac{P_1}{P_2}\right)^2.$$

Accordingly, a power transition of ×2 would result in an amplitude transition of x√2.

Figure 3:
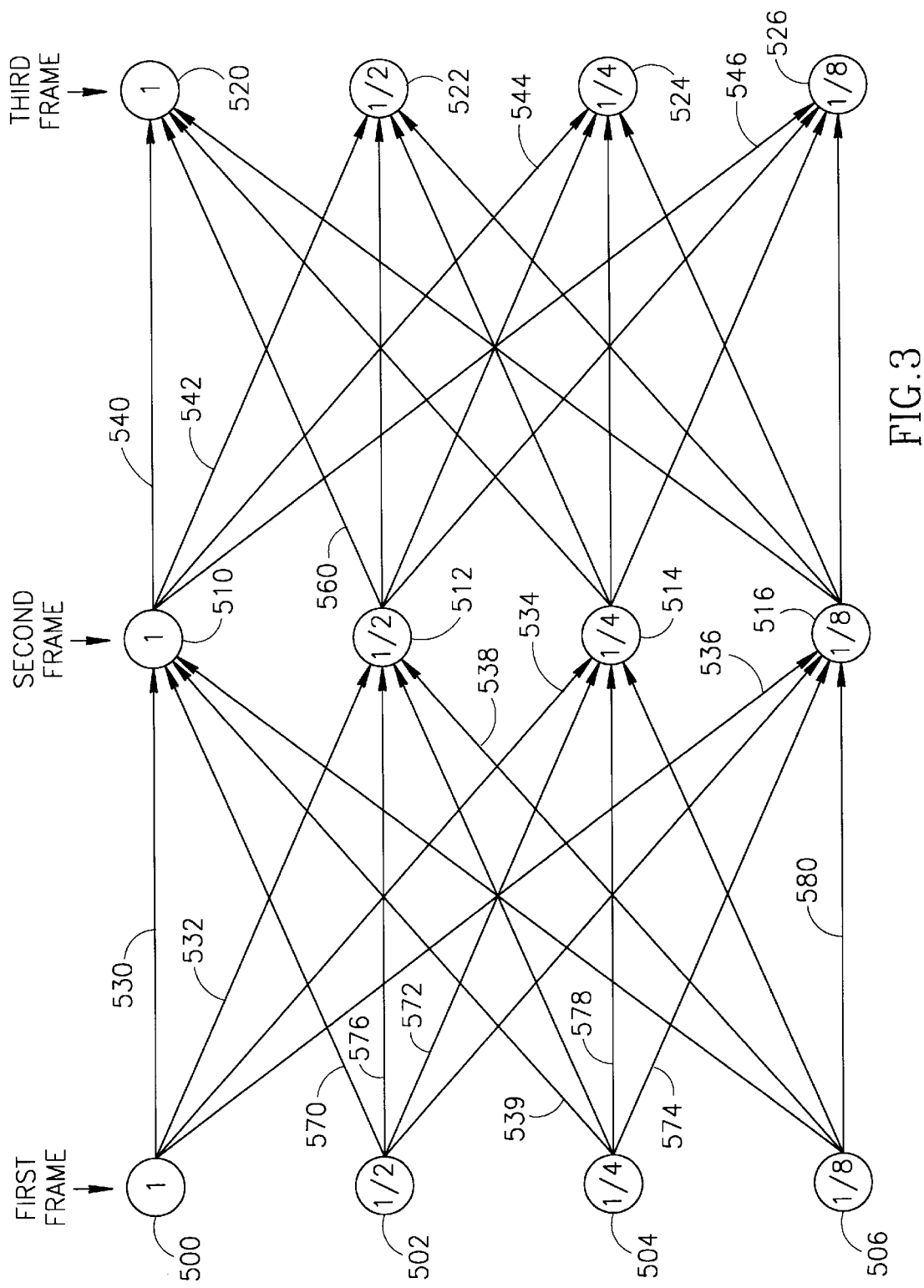
FIG. 3 is a schematic illustration of transition chart between a plurality of frame states.

Reference is now made to FIG. 3, which is a schematic illustration of transition chart between a plurality of frame states.

States 500, 502, 504 and 506, respectively represent a full, half, quarter and eighth rate states of a first frame. States 510, 512, 514 and 516, respectively represent a full, half, quarter and eighth rate states of a second frame. States 520, 522, 524 and 526, respectively represent a full, half, quarter and eighth rate states of a third frame.

Each of the arrows connecting between two states, represents a potential rate transition. Transition 530 represents a rate transition between state 500 and state 510. Transition 542 represents a rate transition between state 510 and state 522.

According to the present invention, if the user-data power of the second frame is four times greater than the user-data power of the first frame then the rate transitions which apply are 538 and 539. Accordingly, the present invention eliminated fourteen transitions.

According to another example, if the user-data power of the second frame is a division by two of the user-data power of the first frame then, the rate transitions which apply are 532, 572 and 574. Accordingly, the present invention eliminated thirteen transitions.

According to a further example, if the user-data power of the second frame is equal to the user-data power of the first frame than the rate transitions which apply are 530, 576, 578 and 580. Accordingly, the present invention eliminated twelve transitions. It will be noted that when the rate of the first frame is known then, the rate of the second frame can be precisely obtained from the user-data power measurements.

According to another aspect of the present invention, the transition trail is extended to more than two frames. For example, if the user-data power of the second frame is four times greater than the user-data power of the first frame and the user-data power of the third frame is greater than the user-data power of the second frame by a factor of two, then, the rate transition trail which applies includes transitions 538 and 560.

In accordance with another aspect of the invention, there is thus provided a rate detection criteria which incorporates user-data power.

Let $c_1$ and $c_2$ be the ratio of the user-data signal amplitude to the pilot signal amplitude in the previous and current frames, respectively, and let $\gamma = c_2/c_1$. Let the data measurements at the previous and current frames be denoted by $data_1$ and $data_2$, respectively. The likelihood of the data measurements in the previous and current frames (given the rates) is $$l(data_1, data_2) = K_1 - N_s \log 2 / rpt_1 + \quad \text{Equation 18}$$

$$\sum_{j=1}^{N_s/rpt_1} \log\left(\exp\left\{\frac{2c_1}{\sigma^2} si_1(j)\right\} + \exp\left\{\frac{-2c_1}{\sigma^2} si_1(j)\right\}\right) +$$

$$K_2 - N_s \log 2 / rpt_2 +$$

-continued $$\sum_{j=1}^{N_s/rpt_2} \log\left(\exp\left\{\frac{2c_2}{\sigma^2}si_2(j)\right\} + \exp\left\{\frac{-2c_2}{\sigma^2}si_2(j)\right\}\right)$$

where $rpt_1$ and $rpt_2$ are the repetition factors in the previous and current frames. Note that $\gamma=\sqrt{rpt_1/rpt_2}$. In addition, $$si_l(j) = \sum_{i=rpt_l\cdot(j-1)+1}^{rpt_l\cdot j} \sum_{f=1}^{N_f} \mathrm{Re}\{d^l(f,i)d_0^{l*}(f,i)\} \quad l=1,2$$

$$K_l = -\frac{1}{\sigma^2}(E_{u_l} + c_l^2 E_{p_l}) - 2N_s N_f \log(\sqrt{\pi}\,\sigma) \quad l=1,2$$

where $E_{u_1}$, $E_{u_2}$ are the user-data energies in the previous and current frames. $E_{p_1}$ and $E_{p_2}$ are the pilot energies in the previous and current frames.

Equation 18 may be simplified by invoking the approximation $\log(e^x+e^{-x}) \cong |x|$, yielding $$l(data_1, data_2) = K_1 - N_s\log 2/rpt_1 + \frac{2c_1}{\sigma^2}\sum_{j=1}^{N_s/rpt_1}|si_1(j)| + \quad\text{Equation 19}$$

$$K_2 - N_s\log 2/rpt_2 + \frac{2c_2}{\sigma^2}\sum_{j=1}^{N_s/rpt_2}|si_2(j)|$$

Given the rates of the previous and current frames, and hence $\gamma$, $c_1$ and $\sigma$ are obtained by optimizing Equation 19 with respect to $c_1$ and $\sigma$ (i.e. setting the appropriate derivatives to 0). This yields, $$\check{c}_1 = \frac{\sum_{j=1}^{N_s/rpt_1}|si(j)| + \gamma\sum_{j=1}^{N_s/rpt_2}|si_2(j)|}{E_{p_1} + \gamma^2 E_{p_2}} \quad\text{Equation 20}$$

$$\check{\sigma} = \sqrt{\frac{1}{2N_sN_f}[E_{u_1} + E_{u_2} - (E_{p_1} + \gamma^2 E_{p_2})\check{c}_1^2]} \quad\text{Equation 21}$$

Substituting Equation 20 and Equation 21 back into Equation 19 yields, $$l(data_1, data_2) = \quad\text{Equation 22}$$

$$-2N_sN_f\log[E_{u_1} + E_{u_2} - \check{c}_1^2(E_{p_1} + \gamma^2 E_{p_2})] -$$

$$\frac{N_s}{rpt_1}\log 2 - \frac{N_s}{rpt_2}\log 2$$

To enable more flexibility, the suggested method is $$l(data_1, data_2) = \quad\text{Equation 23}$$

$$-\beta N_sN_f\log[E_{u_1} + E_{u_2} - \check{c}_1^2(E_{p_1} + \gamma^2 E_{p_2})] + c_{rate_1} + c_{rate_2}$$

where for example $$c_{rate_1} = \frac{-N_s}{rpt_1}\log 2 \quad\text{and}\quad c_{rate_2} = \frac{-N_s}{rpt_2}\log 2.$$

Equation 23 may be improved by adding a correction term such as:

$$\beta\sum_{j=1}^{N_s/rpt}\log\left(1 + \exp\left\{-\left|\frac{4\check{c}_1}{\check{\sigma}^2}si_1(j)\right|\right\}\right) + \quad\text{Equation 24}$$

$$\beta\sum_{j=1}^{N_s/rpt}\log\left(1 + \exp\left\{-\left|\frac{4\check{c}_2}{\check{\sigma}^2}si_2(j)\right|\right\}\right)$$

wherein $\check{c}_2 = \gamma \cdot \check{c}_1$

A simple rate decision method may be implemented by calculating $l(data_1, data_2)$ for each pair of consecutive frames, for all 16 possibilities of current and previous rates. The estimated current rate is the rate for which the maximal value of $l(data_1, data_2)$ is obtained.

We now present an improved rate decision method that is based on dynamic programming. Let $l_{ij}(data_1, data_2)$ denote the likelihood of the previous and current frames under the assumption that the rate at the previous frame is i, and the rate at the current frame is j. $a_j$ represents a current accumulated likelihood variable, under the assumption that the current rate is j. Similarly, $\hat{a}_i$ represents a previous accumulated likelihood variable, under the assumption that the previous rate is i. $a_j$ is computed using $$a_j = \max_i \{\rho \hat{a}_i + (1-\rho)l_{ij}(data)\}$$

where $\rho$ is some forgetting factor (e.g. 0.7). The estimated current rate is $$arg\max_j a_j.$$

Figure 4:
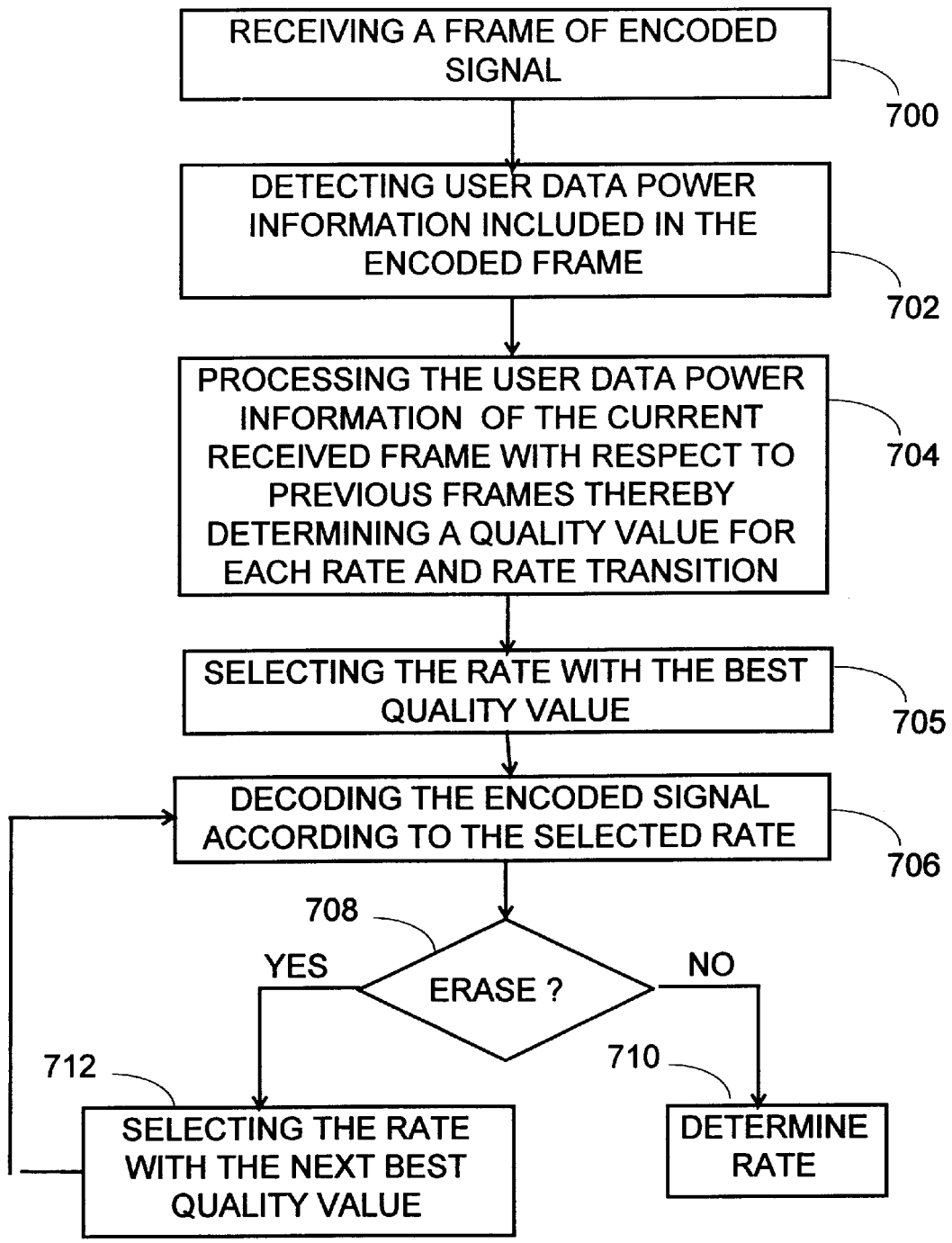
FIG. 4 is a schematic illustration of a method for detecting the encoding rate of a received frame using user data power, operative in accordance with a preferred embodiment of the present invention.

Reference is now made to FIG. 4 which is a schematic illustration of a method for detecting the encoding rate of a received frame using user data power, operative in accordance with yet another preferred embodiment of the present invention. The method includes the following steps:

A. Receiving a frame of encoded signal (step 700),

B. Detecting user data power information, which is included in the received frame (step 702);

C. Processing the user power information of the current received frame with respect to previous frames (step 704). In this step, the method produces a quality value for each rate and rate transition, which is used later to detect the correct rate, according to which the received frame was encoded.

D. Selecting the rate having the best quality value (step 705). The method of the present invention further includes additional steps which provide enhanced performance, refining the detection of the correct rate.

E. decoding the received encoded frame according to the selected rate (706).

F. Detecting if the frame should be erased (step 708). It will be noted that any erasure criteria, which is known in the art, is applicable for the present invention.

G. Determining the selected rate as the rate of the encoded received frame, when the frame qualifies the erasure detection (step 710).

H. Selecting the rate with the next best quality value, when the frame did not qualify the erasure detection (step 712) and repeating from step 706 for this rate.

It will be noted that the repeating of steps 706 through 712 can be limited for a predetermined number of repetitions, a predetermined limit value for the quality values, and the like.

It will be further noted that the user data power information can be used directly, as described hereinabove, or indirectly, incorporated in encoded signal rate quality value criteria as described in Equation 18, Equation 19, Equation 20, Equation 21, Equation 22, Equation 23, Equation 24 and Equation 25.

Figure 5:
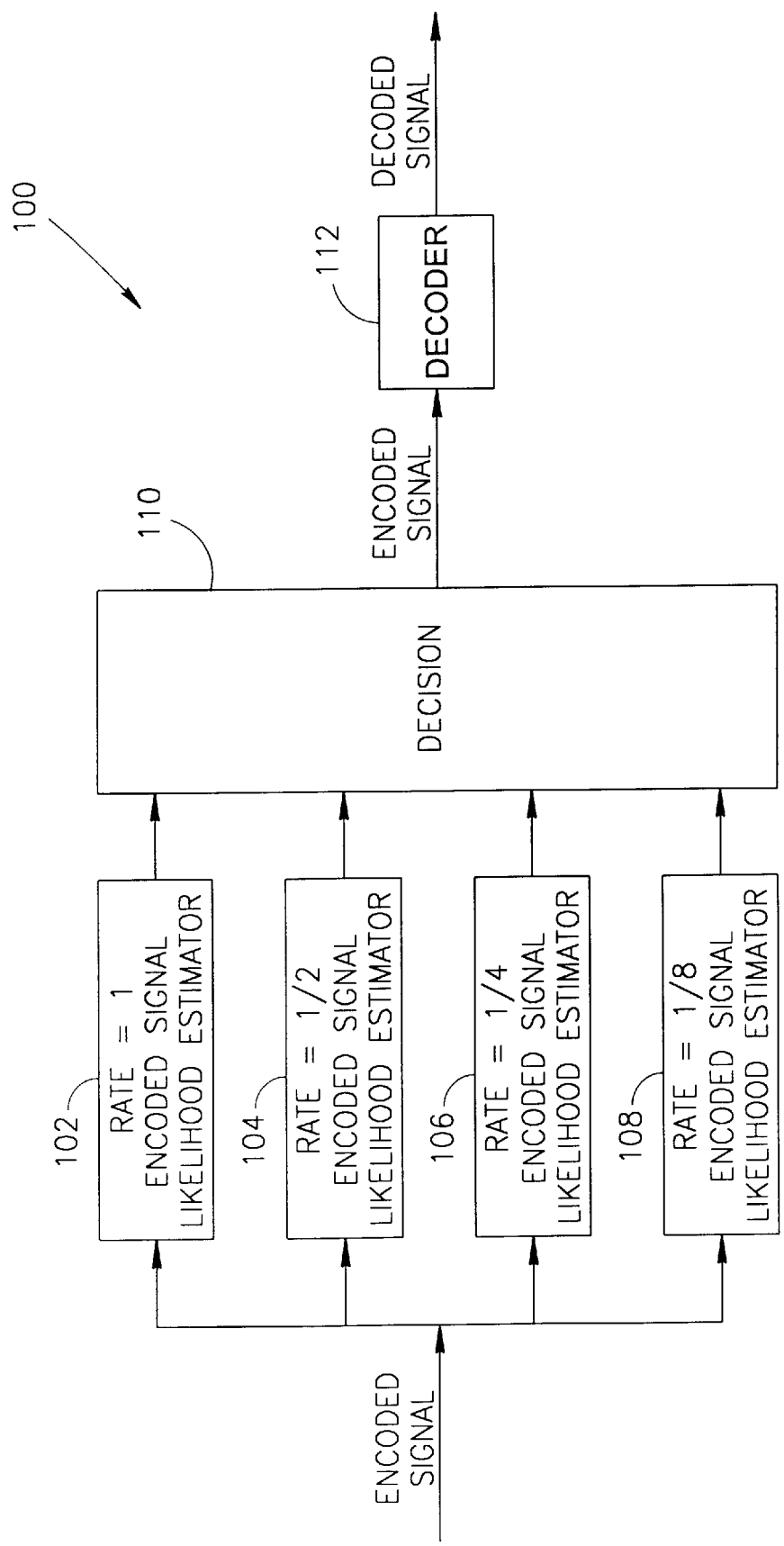
FIG. 5 is a schematic illustrating of a rate detection system, constructed and operative according to another preferred embodiment of the present invention.

Reference is now made to FIG. 5, which is a schematic illustration of a rate detection system, generally referenced 100, constructed and operative in accordance with a preferred embodiment of the present invention.

System 100 includes a plurality of encoded signal quality estimating units 102, 104, 106 and 108, a decision controller 110, connected to units 102, 104, 106 and 108 and a decoder 112, connected to the decision controller.

The estimating unit 102, 104, 106 and 108 can be implemented in hardware or software. Each of these estimating units, detects the received signal and processes, according to a quality criteria set forth by the present invention, with respect to a different rate, thereby yielding a quality value.

The quality value can be calculated using either Equation 8, with or without the smoothing expression provided in Equation 12, Equation 9, with or without the smoothing expression provided in Equation 12, Equation 16, Equation 16 with the correcting term of Equation 17, Equation 23, Equation 23 with the correcting term of Equation 24 or Equation 25.

The received encoded signal is provided to each of the encoded signal quality estimating units 102, 104, 106 and 108 which, in turn, processes the encoded signal, each according to a predetermined rate. Estimating units 102, 104, 106 and 108 processed the encoded signal according to rate=1, ½, ¼ and ⅛, respectively and produce a quality value accordingly.

Then, the decision controller 110 detects the best quality value, thereby selecting the rate which is most likely for the received signal frame. Finally, the decision controller 110 provides a specific rate decoding command to decoder 112, which in turn decodes the received signal according to the selected rate.

By eliminating the need to decode the encoded frame at all of the possible rates, system 100 reduces the amount of resources and power required for detecting the correct rate.

Figure 6:
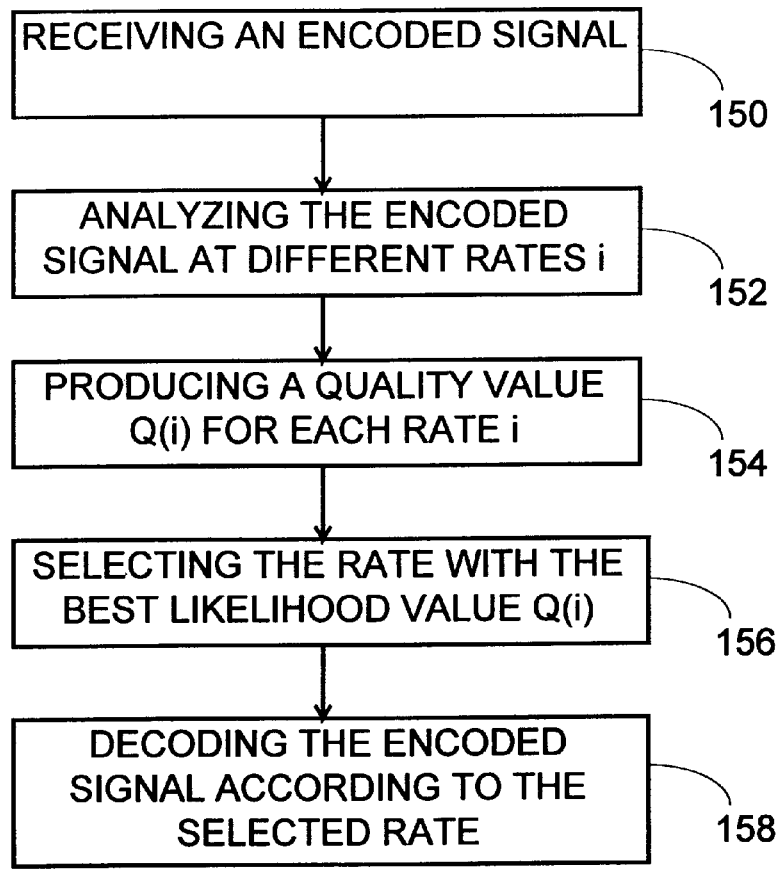
FIG. 6 is a schematic illustration of a method for operating the system of FIG. 5, operative in accordance with a further preferred embodiment of the present invention.

Reference is now made to FIG. 6 which is a schematic illustration of a method for operating system 100, operative in accordance with another preferred embodiment of the present invention.

In step 150, the system receives an encoded signal.

In step 152, the system analyzes the encoded signal at different rates, according to one of the above quality criterion. Then, the system produces a quality value $Q(i)$ for each of the rates i (step 154).

In step 156, the system selects the rate which has the best quality value $Q(i)$. It will be noted that, according to the present embodiment, the system reaches a decision for the appropriate rate without decoding the encoded signal at all.

Finally, after determining the appropriate rate, the system decodes the encoded signal according to the selected rate (step 158) and provides a decoded signal as output for further processing.

Figure 7:
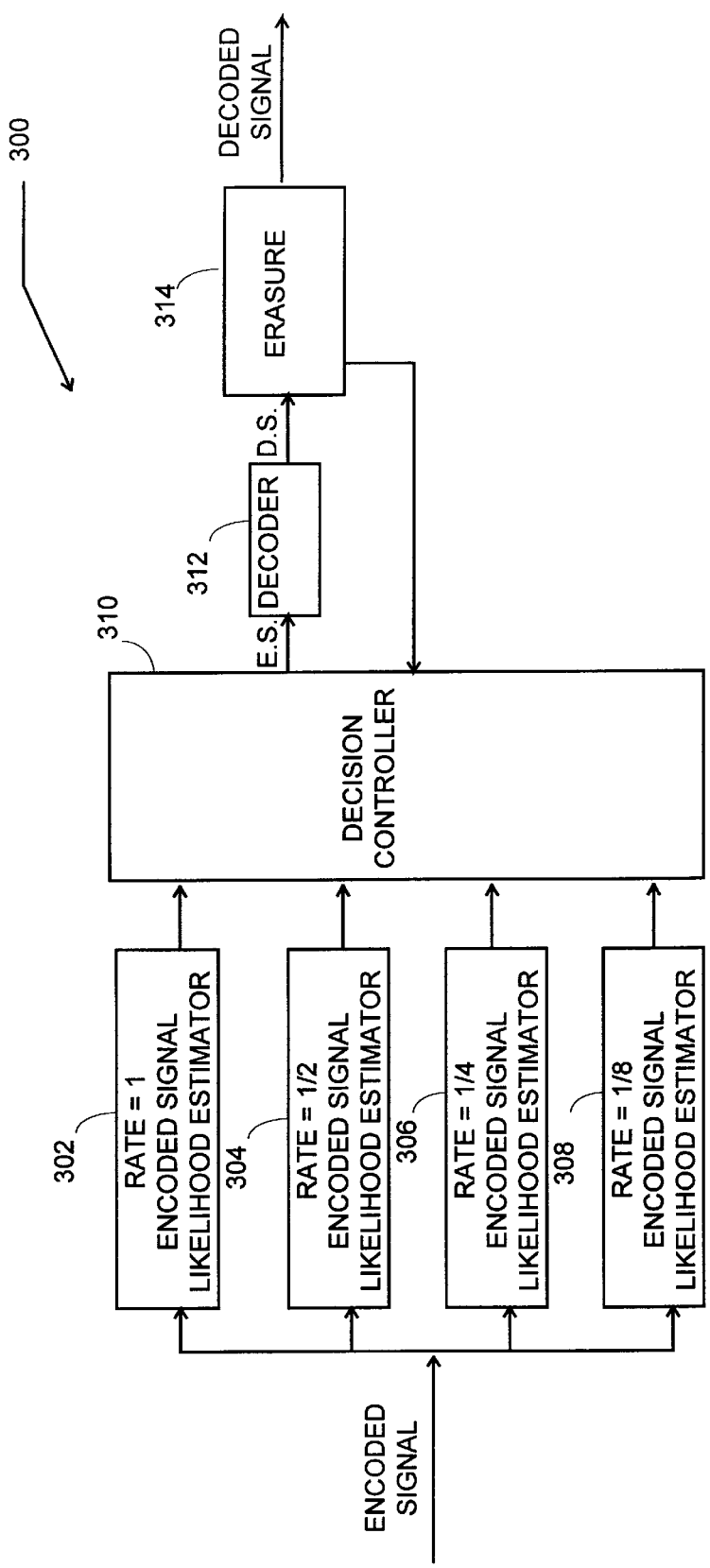
FIG. 7 is a schematic illustration of a rate detecting system, constructed and operative in accordance with another preferred embodiment of the invention.

Reference is now made to FIG. 7 which is a schematic illustration of a rate detecting system, generally referenced 300, constructed and operative in accordance with yet a further preferred embodiment of the invention.

System 300 includes a plurality of encoded signal quality estimating unit 302, 304, 306 and 308, a decision controller 310 connected to units 302, 304, 306 and 308, a decoder 312, connected to the decision controller 310 and an erasure detection unit 314 connected to the decoder 312.

Each of the encoded signal quality estimating units 302, 304, 306 and 308 analyses the encoded signal frame according to a different rate, processes it according to an encoded quality criterion as described above, produces an encoded quality value $Q(i)$ for each of the hypothesis rates, using either and provides this quality value to the decision controller 310.

The quality value $Q(i)$ can be calculated using either Equation 8, with or without the smoothing expression provided in Equation 12, Equation 9, with or without the smoothing expression provided in Equation 12, Equation 16, Equation 16 with the correcting term of Equation 17, Equation 23, Equation 23 with the correcting term of Equation 24 or Equation 25.

The decision controller 310 sorts the received encoded likelihood values $Q(i)$, determines the rate with the best encoded likelihood value $Q(i)$ and provides it to the decoder 312. The decoder 312 decodes the encoded signal frame, according to this rate, thereby producing a decoded signal frame and provides it to the erasure detection unit 314.

The erasure detection unit 314 analyses the decoded signal frame so as to determine if this frame is to be allowed or erased. If this frame is to be allowed then the erasure detection unit 314 provides it to the transceiver apparatus for further processing according to the selected rate. Otherwise, the erasure detection units 314 informs the decision controller that this frame is not allowed.

The erasure detection unit 314 operates according to an erasure detection criteria which is based on CRC information, bit error rate estimation or accumulated Viterbi metric. It will be noted that the erasure criteria can also be based on a combination of CRC information, bit error rate estimation and accumulated Viterbi metric.

The decision controller 310 then selects the rate with the next best encoded quality value $Q(i)$ and provides it to the decoder 312. Then, the decoder 312 decodes the encoded signal frame according to this rate, thereby producing a decoded frame and provides it to the erasure detection unit 314.

The erasure detection unit 314 analyses the frame, according to the next best encoded likelihood value, and determines if this frame is to be erased or allowed. If the erasure detection unit 314 determines that this frame is to be allowed, then it provides it to the transceiver apparatus for further processing according to this rate. Otherwise, the erasure detection unit 314 instructs the rest of the system 300 to proceed to the next encoded signal frame (i.e., the current frame is to be erased).

It will be noted that the operation of repeating decoded and detecting erasure can be performed either for all of the rates, as long as the signal frame fails the erasure test, or end at a predetermined number of quality level (i.e., for example stop after the next best quality value and proceed to the next frame).

Figure 8:
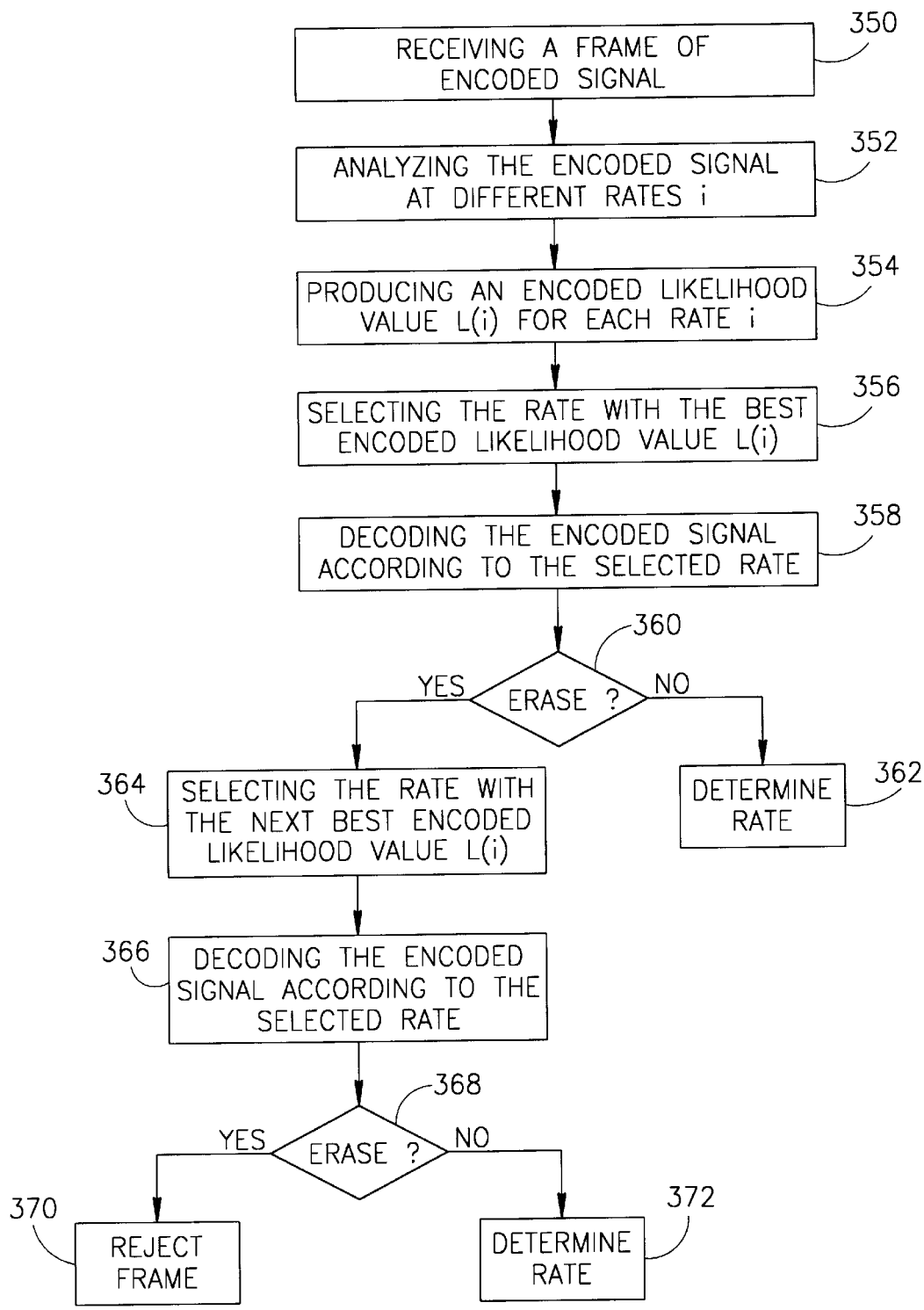
FIG. 8 is a schematic illustration of a method for operating the system of FIG. 7, operative in accordance with yet another preferred embodiment of the present invention.

Reference is now made to FIG. 8 which is a schematic illustration of a method for operating system 300, operative in accordance with yet another preferred embodiment of the present invention.

In step 350, the system 300 receives a frame of encoded signal.

In step 352, the system 300 analyses the encoded signal at different rates I, produces an encoded quality value $Q(i)$ for each of the rates i (step 354).

In step 356, the system selects the rate with the best encoded quality value $Q(i)$.

In step 358, the system decodes the encode signal frame according to the selected rates, having the best encoded quality value $Q(i)$.

In step 360, the system 300 determines if the decoded frame is to be either allowed or erased. If the frame is to be allowed, then this frame should be further processed according to this rate. Otherwise, the system 300 proceeds to step 364.

In step 364, the system selects the rate with the next best encoded quality value Q(i).

In step 366, the system 300 decodes the encoded signal according to the current selected rate, having the next best encoded likelihood value.

In step 368, the system determines if this frame is to be either allowed or erased. If the system 300 determines that this frame is to be allowed, then it provides the frame, together with the current selected rate, to a transceiver apparatus, in which system 300 is incorporated, for further processing according to this rate (step 372). Otherwise, the system rejects (erases) this frame and proceeds to the next frame (step 370).

It will be noted that steps 364, 366, 364, 370 and 372, can be duplicated for further levels of detection, for example, for the third best quality value, and the like.

It will be appreciated that the present invention provides several approaches to determine the rate of a received frame without decoding and re-encoding the frame according to all of the possible rate hypotheses. It will be noted that each of these novel and innovative approaches can be combined to produce an enhanced rate detection mechanism.

Figure 9:
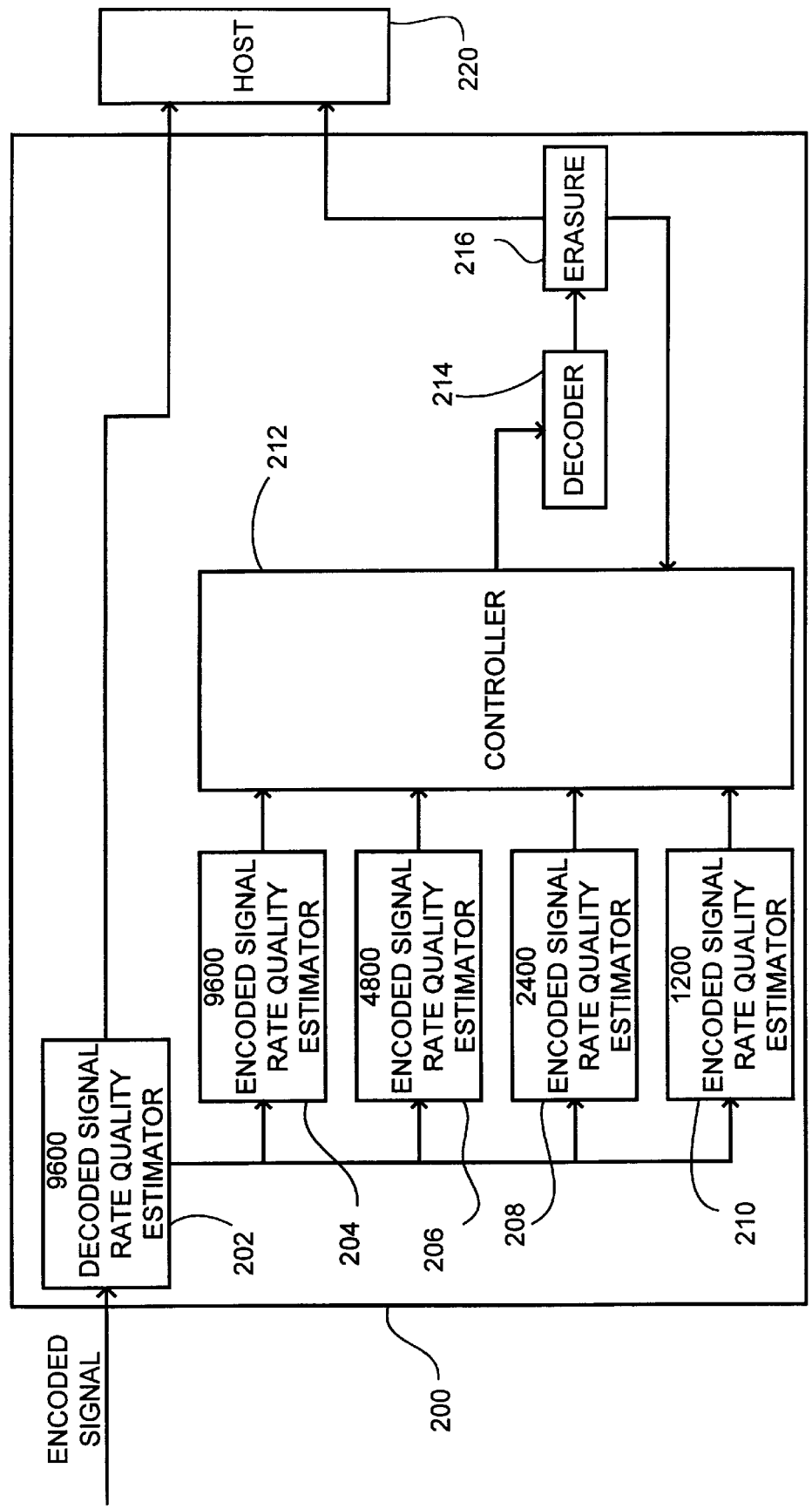
FIG. 9 is a schematic illustration of a system for detecting rate, constructed and operative in accordance with another preferred embodiment of the present invention.

Reference is now made to FIG. 9, which is a schematic illustration of a system for detecting rate, generally referenced 200, constructed and operative in accordance with another preferred embodiment of the present invention.

System 200 includes a decoded signal quality estimator 202 for rate 9600, an encoded signal quality estimator 204, for rate 9600, encoded signal quality estimators 206, 208 and 210 for rates 4800, 2400 and 1200, respectively, a controller 212, a decoder 214 and an erasure detection unit 216.

Encoded signal quality estimators 204, 206, 208 and 210 are connected to controller 212 and to decoded signal quality estimator 202. Controller 212 is further connected to decoder 214 and to erasure detection unit 216, which are further connected therebetween. The erasure detection unit 216 is also connected to a host 220.

Decoded signal rate quality estimator 202 receives an incoming encoded signal frame, decodes it at a rate of 9600 and calculates quality values which incorporates CRC information, bit error rate and accumulated Viterbi metric or a combination of the above.

If the quality values exceed predetermined threshold values and the decoding process is complete without any CRC errors, then, the decoded signal rate quality estimator 202 provides the decoded signal to the host 220 and proceeds to the next frame. Otherwise, the decoded signal rate quality estimator 202 provides the encoded frame to encoded signal estimators 204, 206, 208 and 210.

The encoded signal estimators 204, 206, 208 and 210, process the encoded signal, thereby producing quality value, each for its predetermined rate and provide these values to the controller 212. The controller 212 selects the rate with the best quality value and provides it with the encoded frame to the decoder 214. The decoder 214 decodes the encoded frame and provides it to the erasure detection unit 216, which in turn processes it according to an erasure criteria as set forth hereinabove.

If the erasure detection unit 216 determines that the frame is to be allowed, then it provides the decoded frame to the host 220. Otherwise, the erasure detection unit 216 instructs the controller 212 to proceed to the rate with the next best quality value and the process of decoding and erasure detecting is repeated for this rate.

By eliminating the need to decode the encoded frame at all of the possible rates, system 200 reduces the amount of resources and power required for detecting the correct rate.

Figure 10:
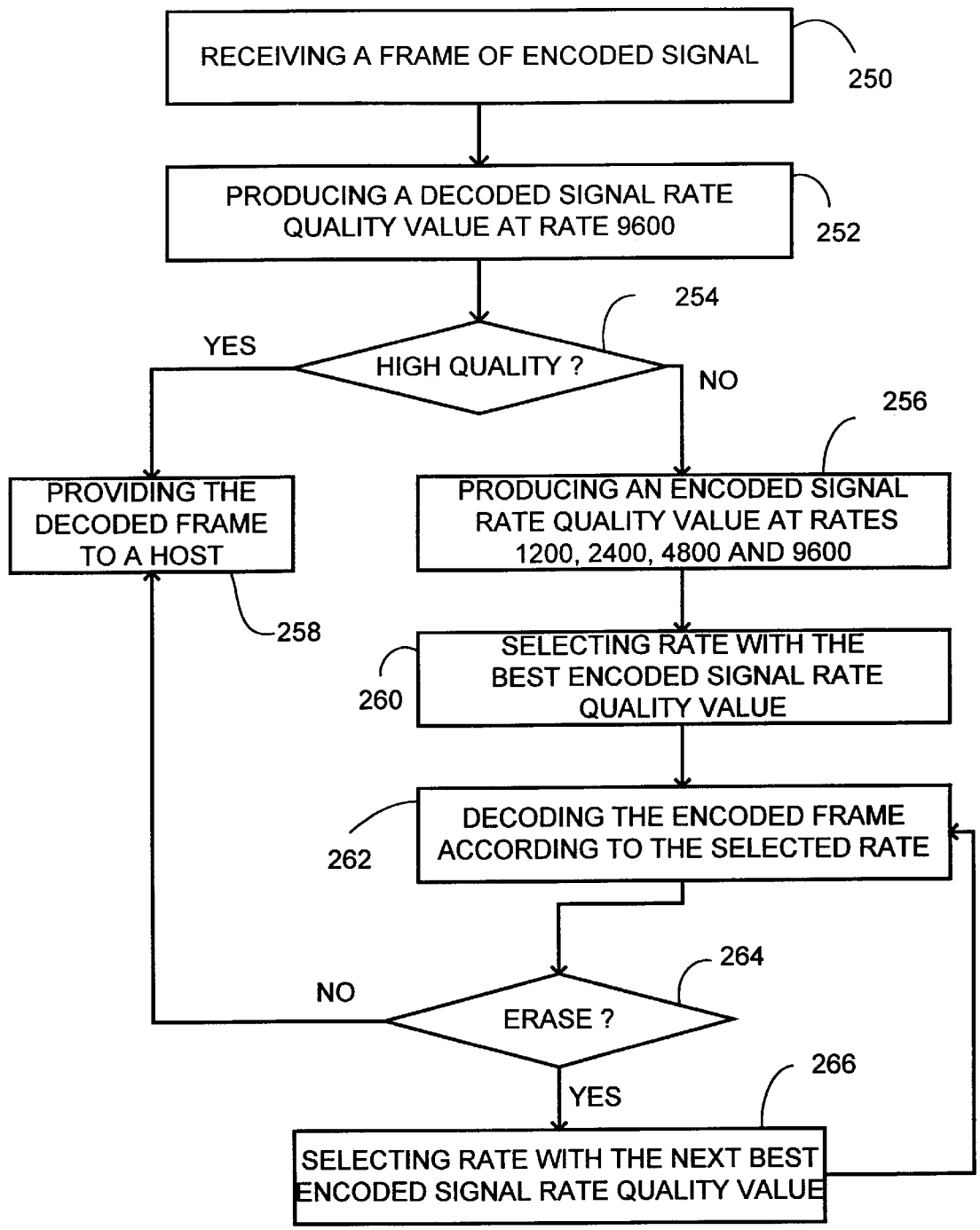
FIG. 10 is a schematic illustration of a method for operating the system of FIG. 9, operative in accordance with a further preferred embodiment of the present invention.

Reference is now made to FIG. 10 which is a schematic illustration of a method for operating the system of FIG. 9, operative in accordance with a further preferred embodiment of the present invention.

In step 250, the system 200 (FIG. 9) receives a frame of encoded signal. The system 200 processes the frame according to a hypothesis of rate=9600, thereby decoding it and producing a quality value therefore (step 252.

In step 254, the system 200 detects if the quality of value exceeds a predetermined threshold and that the decoding of this frame according to rate=9600 is completely without CRC errors. If so, then the system 200 proceeds to step 258 where it provides the decoded frame to a host, connected thereto. Otherwise, the system 200 proceeds to step 256.

In step 256, the system 200 produces an encoded signal rate quality value for each of the rates in the rate-set. It will be noted that the encoded quality value for rate=9600 determines if this frame, when predetermined as a speech frame, although probably included CRC errors, may still be used. If will further be noted that this is not possible for a data frame.

In step 260, the system 200, detects best quality value (be it maximized, minimized, and the like), selects the rate, associated therewith and decodes the received frame according the selected rate (step 262).

In step 264, the system 200 processes the decoded according to an erasure criteria. If the system 200 determines the frame as erased, then, the system 200 selects the rate with the next best quality value and repeats from step 262. Otherwise, the system proceeds to step 258.

In step 258, the system 200 provides the decoded frame to a host, connected thereto.

Figure 11:
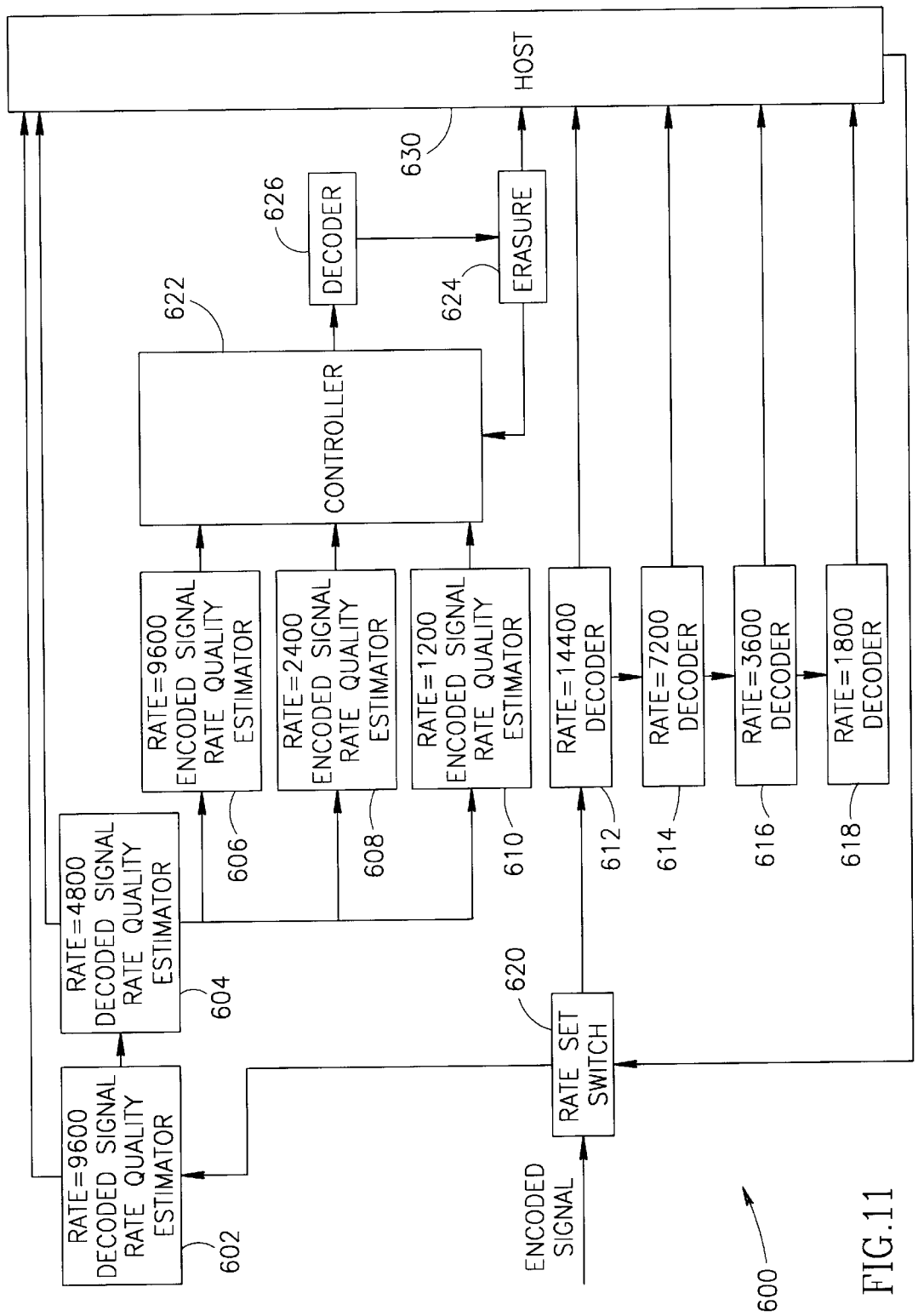
FIG. 11 is a schematic illustration of a system for detecting rate, constructed and operative in accordance with another preferred embodiment of the present invention.

Reference is made now to FIG. 11, which is a schematic illustration of a system for detecting rate, generally referenced 600, constructed and operative in accordance with another preferred embodiment of the present invention.

System 600 includes a rate-set switch 620, a plurality of rate estimators 602, 604, 606, 608 and 610, a plurality of decoders 612, 614, 616 and 618, a controller 622, a decoder 626 and an erasure detection unit 624. System 600 is connected to a host 630.

System 600 is adaptive to operate at two rate-sets, providing a specialized section for each of them. The section operative according to rate-set one includes rate estimators 602, 604, 606, 608 and 610. The section operative according to rate-set two includes decoders 612, 614, 616 and 618.

Rate-set switch 620 is connected to the host 630, rate estimator 602, decoder 612 and to an encoded signal source (not shown). Decoded signal rate quality estimator 602 is further connected to the host 630 and to decoded signal rate quality estimator 604. Decoded signal rate quality estimator 604 is further connected to encoded signal rate quality estimators 606, 608 and 610 as well as to the host 630. encoded signal rate quality estimators 606, 608 and 610 are further connected to the controller 622.

Decoder 612 is further connected to decoder 614 and to the host 630. Decoder 614 is further connected to decoder 616 and to the host 630. Decoder 616 is further connected to decoder 618 and to the host 630. Decoder 618 is further connected to the host 630.

The decoder 626 and the erasure detection unit 624 are connected therebetween, as well as to the controller 622. The erasure detection unit 624 is further connected to the host 630.

The host 630 provides a rate-set mode command to the rate-set switch 620, for operating the system 600 according to one of the rate sets, rate-set one or rate-set 520. The rate-set switch 620 receives an encoded signal frame and provides it to decoded signal rate quality estimator 602, when operating in rate-set one mode and to decoder 612, when operating in rate-set two mode.

Decoded signal rate quality estimator 602 decodes the encoded signal frame according to rate=9600 and produces a quality value, associated therewith. If the quality value exceeds a predetermined value and the frame is decoded with no CRC errors, then the decoded signal rate quality estimator 602 provides the decoded frame to the host 630. Otherwise, the decoded signal rate quality estimator 602 provides the encoded frame to decoded signal rate quality estimator 604.

Decoded signal rate quality estimator 604 decodes the encoded signal frame according to rate=4800 and produces a quality value, associated therewith. If the quality value exceeds a predetermined value and the frame is decoded with no CRC errors, then the decoded signal rate quality estimator 604 provides the decoded frame to the host 630. Otherwise, the decoded signal rate quality estimator 604 provides the encoded frame to encoded signal rate quality estimators 606, 608 and 610.

Encoded signal rate quality estimators 606, 608 and 610 process the encoded frame according to rates of 9600, 2400 and 1200, respectively, thereby producing respective quality values and provide them to the controller 622. The controller 622 selects the best quality value and provides the encoded signal to decoder 626, along with a command to decode it according to the rate associated with the selected rate.

The decoder 626 produces a decoded frame and provides it to the erasure detection unit 624, which in turn determines if the frame should be allowed or erased. If the erasure detection unit 624 determines that the frame is to be allowed, it provides it to the host 630. Otherwise, the erasure detection unit 624 informs the controller 622 that the frame, as encoded according to the selected rate, is not allowed.

Then, the controller 622 selects the next best quality value and provides a command to the decoder 626, so as to decode the encoded frame according to the rate associated therewith. The process of decoding the frame and detection erasure is then repeated for this rate and optionally for the third rate unit the frame, decoded according to one of the rates is either allowed or finally rejected (erased).

Decoder signal rate quality estimator 612 decodes the encoded signal frame according to rate=14400, produces a 14400 decoded quality value, associated therewith. The 14400 decoded quality value can be calculated according to either CRC information, symbol error rate, accumulated Viterbi metric or on a combination thereof.

If the 14400 decoded quality value exceeds a predetermined threshold value and the respective decoded frame does not include CRC errors, then, the decoder 612 provides the decoded frame to the host 630. Otherwise, the decoder 612 provides the encoded signal to decoder 614.

Decoder 614 repeats the same operations performed by decoder 612, for rate=7200 and produces a 7200 decoded quality value. Accordingly, if the 7200 decoded quality value exceeds a predetermined threshold value and the respective decoded frame does not include CRC errors, then, the decoder 614 provides the respective decoded frame (now decoded according to rate=7200) to the host 630. Otherwise, the decoder 614 provides the encoded signal to decoder 616.

Decoder 616 repeats the same operations performed by decoder 614, for rate=3600 and produces a 3600 decoded quality value. Accordingly, if the 3600 decoded quality value exceeds a predetermined threshold value and the respective decoded frame does not include CRC errors, then, the decoder 616 provides the decoded frame (now decoded according to rate=3600) to the host 630. Otherwise, the decoder 616 provides the encoded signal to decoder 618.

Finally, decoder 618 repeats the same operations performed by decoder 616, for rate=1800 and produces a 1800 decoded quality value. If the 1800 decoded quality value exceeds a predetermined threshold value and the respective decoded frame does not include CRC errors, then, the decoder 618 provides the decoded frame (now decoded according to rate=1800) to the host 630. Otherwise, the decoder 618 informs the host 630 that the encoded frame failed decoding according to all of the rates in the rate-set and as such should be erased.

By eliminating the need to detect the encoded frame at all of the possible rates, the above cascade structure, provided for system 600, reduces the amount of resources and power required for detecting the correct rate.

As long as the frame is not allowed, the above process is repeated for the next rate, serially. Finally, if the frame is erased for these rates, then the system 600 proceeds to the next received frame.

Figure 12:
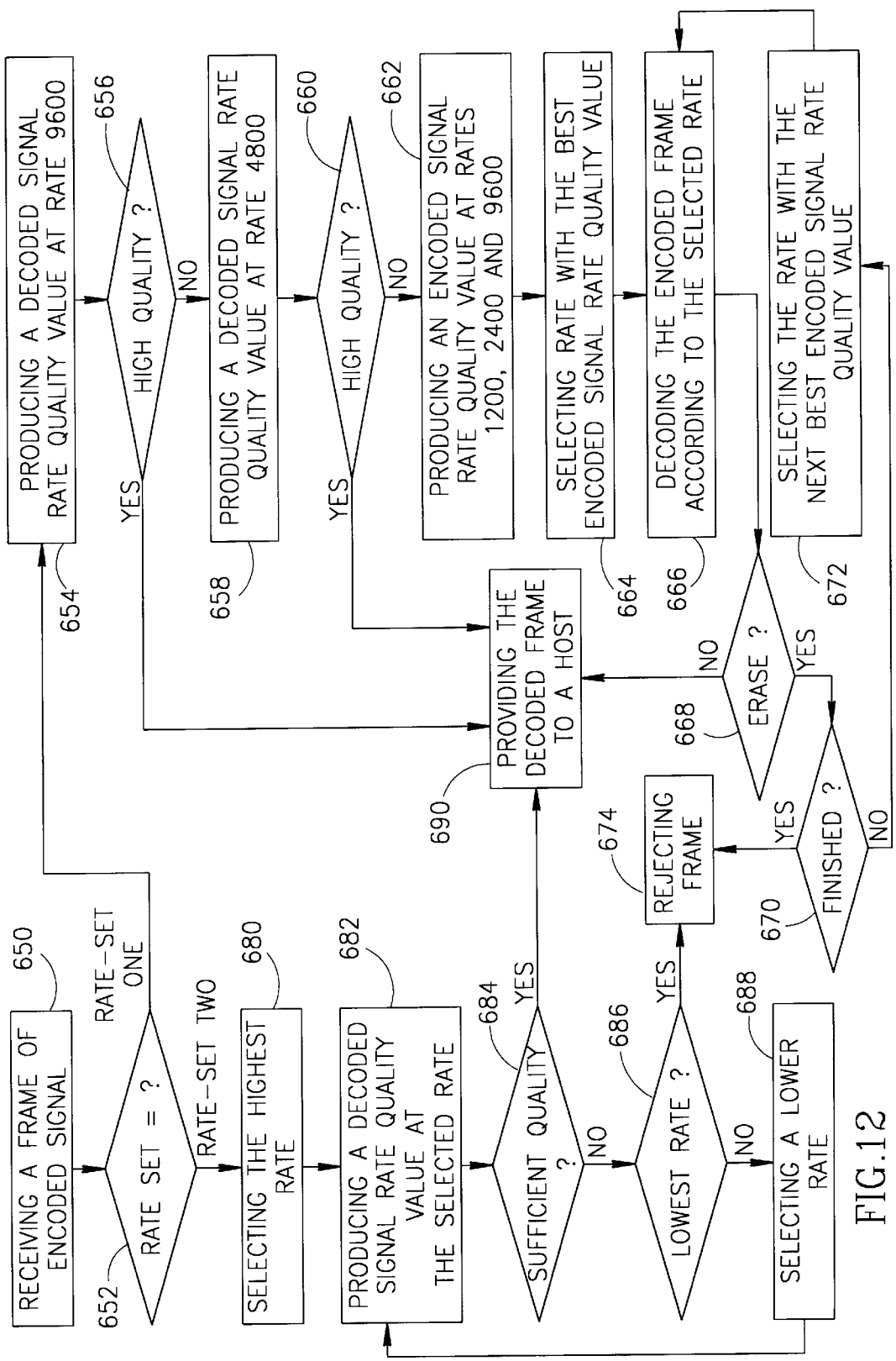
FIG. 12 is a schematic illustration of a method for operating the system of FIG. 11, operative in accordance with a further preferred embodiment of the present invention.

Reference is now made to FIG. 12 which is a schematic illustration of a method for operating the system of FIG. 11, operative in accordance with a further preferred embodiment of the present invention.

In step 650, the system 600 receives a frame of encoded signal and determines, according to a predetermined host command the rate-set, according to which the frame is to be analyzed (step 652). If the frame is to be analyzed according to rate-set one, then, the system 600 proceeds to step 654. Otherwise, the system 600 proceeds to step 680.

In step 654, the system 600 produces a decoded signal rate quality value, at rate=9600.

In step 656, the system 600 determines if the decoding quality of the frame according to this rate is high enough, by detecting if the quality value exceeds a predetermined threshold value and by detecting if the decoded frame has no CRC errors. If so, then the system proceeds to step 690. Otherwise, the system proceeds to steps 658 and 660, thereby repeating the process of steps 654 and 656 according to rate 4800.

If the quality according to rate=4800 is determined high then, the system proceeds to step 662, thereby producing an encoded signal rate quality value for rates 9600, 2400 and 1200.

In step 664, the system 600 selects the best quality value, from the ones produces in step 662 and decodes the encoded frame according to the rate associated therewith (step 666).

In step 668, the system 600 determines if the decoded frame, is to be erased or allowed. If the frame is to be erased, then the system 600 determines if the encoded frame is to be further analyzed according to one or two of the remaining rates (step 670). If so, then the system 600 selects the rate with the next best quality value (step 672) and repeats steps 666 and for 668 for this selected rate.

If the system 600 determines in step 668 that the frame is allowed, then, it provides the decoded frame and rate information to a host connected thereto (step 690).

In step 680, the system 600 selects the highest rate in rate-set two, which in the present example (IS-95) is 14400 bits per second.

In step 682 the system 600 produces a decoded signal rate quality value at the selected rate.

In step 684, the system 600 determines if the quality of the decoding process according to the selected rate is high enough, by detecting if the quality value exceeds a predetermined threshold value and the respective decoded frame has no CRC errors. If the quality is determined high, then, the system 600 proceeds to step 690, where it provided the decoded frame and rate information to the host, connected thereto.

Otherwise, the system 600 detects if the selected rate is the lowest available. If not, then, the system selects the lower rate (at this stage rate=7200, followed later by rate=3600, which in turn is followed by rate=1800—the lowest rate available) and repeats from 682.

The above quality evaluation equations are provided under the assumption that puncturing is not present, after symbol repetition. It will be noted that converting these equations for use in an environment which includes puncturing, either power control puncturing or coding puncturing (as in rate-set 2 of IS-95) requires straight forward algebraic modifications.

It will be appreciated by persons skilled in the art that the present invention is not limited to what has been particularly shown and described hereinabove. Rather the scope of the present invention is defined only by the claims which follow.

What is claimed is:

1. In a receiver receiving an encoded signal frame, the encoded signal frame being encoded in one of a plurality rates, a rate detection device comprising:
   - a plurality of encoded signal quality estimators each having a different one of said plurality of rates associated therewith, wherein each estimator processes said encoded signal frame according to its associated rate, thereby producing a quality value for said associated rate;
   - a decoded signal quality estimator connected before said encoded signal quality estimators, for pre-processing and encoded signal frame according to a predetermined one of said plurality of rates; and
   - a controller connected to said plurality of encoded signal quality estimators,
   - wherein said controller selects the rate having the best quality value and provides said selected rate to said receiver,
   - wherein said decoded signal quality estimator produces a decoded quality value for said predetermined rate, decodes said frame according to said predetermined rate and provides said decoded frame to said receiver when said decoded quality value exceeds a predetermined quality threshold value,
   - wherein said encoded signal quality estimators process and encoded signal frame when said decoded quality value does not exceed said predetermined quality threshold value.

2. The rate detection device according to claim 1 wherein said decoded quality value further includes a representation of the presence of CRC errors in said decoded frame.

3. In a receiver including a host, receiving an encoded signal frame, the encoded signal frame being encoded in a particular rate in a given rate-set, the rate-set selected from a plurality of rate-sets, each rate-set including a plurality of rates, a rate detection device comprising:
   - at least one decoded signal quality estimator, connected in series therebetween and further connected to said host, each for decoding said encoded signal frame at a different rate selected from a first one of said rate-sets, when the previous one of said at least one decoded signal quality estimator failed to decode said encoded signal frame, and for producing a decoded signal quality value thereof,
   - a plurality of encoded signal quality estimators, connected in parallel therebetween and after said at least one decoded signal quality estimator, for processing said encoded signal frame, each at a different rate of said first rate-set, thereby producing encoded signal quality values, when all of said at least one decoded signal quality estimator failed to correctly decode said encoded signal frame,
   - a controller connected to said at least one encoded signal quality estimator,
   - a decoder connected to said controller,
   - an erasure detection unit connected to said controller, said decoder and said host, operative according to a predetermined erasure criteria,
   - wherein said controller selects the best of said encoded signal quality values, said decoder decodes said encoded signal frame according to the rate associated with said selected encoded signal quality value, thereby producing a decoded frame, and
   - wherein said erasure detection unit provides said decoded frame to said host when determining said decoded frame allowed.

4. The rate detection device according to claim 3, wherein each said plurality of encoded signal quality estimators processes said encoded signal frame according to an encoded quality criteria which is selected from the group consisting of:

$$l(data) = c_{rate} + \beta \sum_{j=1}^{N_s/rpt} \log\left(\exp\left\{\frac{2\hat{c}}{\hat{\sigma}^2}si(j)\right\} + \exp\left\{\frac{-2\hat{c}}{\hat{\sigma}^2}si(j)\right\}\right);$$

$$l(data) = c_{rate} + \beta \sum_{j=1}^{N_s/rpt} \log\left(\exp\left\{\frac{2\hat{c}}{\overline{\sigma}^2}si(j)\right\} + \exp\left\{\frac{-2\hat{c}}{\overline{\sigma}^2}si(j)\right\}\right)$$

where $\overline{\sigma}_t^2 = \overline{\sigma}_{t-1}^2 \cdot \delta + \hat{\sigma}_t^2 \cdot (1-\delta);$ $$l(data) = c_{rate} + \sum_{j=1}^{N_s/rpt} \log\left(\exp\left\{\frac{2\hat{c}\beta}{\hat{\sigma}^2}si(j)\right\} + \exp\left\{\frac{-2\hat{c}\beta}{\hat{\sigma}^2}si(j)\right\}\right);$$

$$l(data) = c_{rate} + \sum_{j=1}^{N_s/rpt} \log\left(\exp\left\{\frac{2\hat{c}\beta}{\overline{\sigma}^2}si(j)\right\} + \exp\left\{\frac{-2\hat{c}\beta}{\overline{\sigma}^2}si(j)\right\}\right)$$

where $\overline{\sigma}_t^2 = \overline{\sigma}_{t-1}^2 \cdot \delta + \hat{\sigma}_t^2 \cdot (1-\delta);$ $$l(data) = -\beta N_s N_f \log(E_u - \hat{c}^2 E_p) + c_{rate};$$

$$l(data) = -\beta N_s N_f \log(E_u - \hat{c}^2 E_p) + c_{rate} + \beta \sum_{j=1}^{N_s/rpt} \log\left(1 + \exp\left\{-\left|\frac{4\hat{c}}{\hat{\sigma}^2}si(j)\right|\right\}\right);$$

$$l(data_1, data_2) = K_1 - N_s \log 2 / rpt_1 + \sum_{j=1}^{N_s/rpt_1} \log\left(\exp\left\{\frac{2c_1}{\sigma^2}si_1(j)\right\} + \exp\left\{\frac{-2c_1}{\sigma^2}si_1(j)\right\}\right) + K_2 - N_s \log 2 / rpt_2 + \sum_{j=1}^{N_s/rpt_2} \log\left(\exp\left\{\frac{2c_2}{\sigma^2}si_2(j)\right\} + \exp\left\{\frac{-2c_2}{\sigma^2}si_2(j)\right\}\right);$$

$$l(data_1, data_2) = K_1 - N_s \log 2 / rpt_1 + \frac{2c_1}{\sigma^2}\sum_{j=1}^{N_s/rpt_1} |si_1(j)| +$$

-continued $$K_2 - N_s \log 2 / rpt_2 + \frac{2c_2}{\sigma^2} \sum_{j=1}^{N_s/rpt_2} |si_2(j)|;$$

$$\breve{c}_1 = \frac{\sum_{j=1}^{N_s/rpt_1} |si_1(j)| + \gamma \sum_{j=1}^{N_s/rpt_2} |si_2(j)|}{E_{p_1} + \gamma^2 E_{p_2}};$$

$$\breve{\sigma} = \sqrt{\frac{1}{2N_s N_f}\left[E_{u_1} + E_{u_2} - (E_{p_1} + \gamma^2 E_{p_2})\breve{c}_1^2\right]};$$

$l(data_1, data_2) =$ $$-2N_s N_f \log\left[E_{u_1} + E_{u_2} - \breve{c}_1^2(E_{p_1} + \gamma^2 E_{p_2})\right] - \frac{N_s}{rpt_1}\log 2 - \frac{N_s}{rpt_2}\log 2;$$

$l(data_1, data_2) =$ $$-\beta N_s N_f \log\left[E_{u_1} + E_{u_2} - \breve{c}_1^2(E_{p_1} + \gamma^2 E_{p_2})\right] + c_{rate_1} + c_{rate_2};$$

$l(data_1, data_2) = -\beta N_s N_f \log\left[E_{u_1} + E_{u_2} - \breve{c}_1^2(E_{p_1} + \gamma^2 E_{p_2})\right] +$ $$c_{rate_1} + c_{rate_2} + \beta \sum_{j=1}^{N_s/rpt} \log\left(1 + \exp\left\{-\left|\frac{4\breve{c}_1}{\breve{\sigma}^2} si_1(j)\right|\right\}\right) +$$

$$\beta \sum_{j=1}^{N_s/rpt} \log\left(1 + \exp\left\{-\left|\frac{4\breve{c}_2}{\breve{\sigma}^2} si_2(j)\right|\right\}\right); \text{ and}$$

$$a_j = \max_i \{\rho \hat{a}_i + (1-\rho) l_{ij}(data)\}.$$

5. The rate detection device according to claim 3, wherein said controller selects the next best of said encoded signal quality values when said erasure detection unit does not allow said decoded frame, said decoder decodes said encoded signal frame according to the rate associated with said selected next best encoded signal quality value, thereby producing a decoded frame, and wherein said erasure detection unit provides said decoded frame to said host when determining said decoded frame allowed.

6. The rate detection device according to claim 5, wherein said erasure detection unit determines said decoded frame as erased after said controller repeated said selecting, a predetermined number of times.

7. The rate detection device according to claim 3, further comprising:

a plurality of decoders, connected in series therebetween and further connected to said host, each for decoding said encoded signal frame at a different rate selected from a second one of said rate-sets, when the previous one plurality of decoders failed to correctly decode said encoded signal frame, and a rate-set switch connected to said host and before the first of said at least one decoded signal quality estimator and the first of said decoders, for routing said encoded signal frame to said first of said at least one decoded signal quality estimator, when in a mode according to said first rate-set and for routing said encoded signal frame to said first of said at least one decoders, when in a mode according to said second rate-set, wherein a decoder of said plurality of decoders which succeeds in producing a correctly decoded frame, provides said correctly decoded frame to said host.

8. The rate detection device according to claim 7, wherein the successes and failure of each said decoders, to decode said encoded signal frame is determined according to an erasure detection criteria.

9. In a receiver including a host, receiving an encoded signal frame, the encoded signal frame being encoded in a particular rate in a given rate-set, the rate-set selected from a plurality of rate-sets, each rate-set including a plurality of rates, a rate detection device comprising:

a plurality of decoders, connected in series therebetween and further connected to said host, each for decoding said encoded signal frame at a different rate selected from a first one of said rate-sets, when the previous one plurality of decoders failed to correctly decode said encoded signal frame, wherein a decoder of said plurality of decoders which succeeds in producing a correctly decoded frame, from said decoding said encoded signal frame, provides said correctly decoded frame to said host.

10. The rate detection device, according to claim 9, further comprising:

at least one decoded signal quality estimator, connected in series therebetween and further connected to said host, each for decoding said encoded signal frame at a different rate selected from a second one of said rate-sets, when the previous one of said at least one decoded signal quality estimator failed to correctly decode said encoded signal frame, and for producing a decoded signal quality value thereof, at least one encoded signal quality estimator, connected in parallel therebetween and after said at least one decoded signal quality estimator, for processing said encoded signal frame, each at different rate of said second rate-set, thereby producing encoded signal quality values, when all of said at least one decoded signal quality estimator failed to correctly decode said encoded signal frame, a controller connected to said at least one encoded signal quality estimator, a decoder connected to said controller, an erasure detection unit connected to said controller, said decoder and said host, operative according to a predetermined erasure criteria, and a rate-set switch connected to said host and before the first of said at least one decoded signal quality estimator and the first of said decoders, for routing said encoded signal frame to said first of said at least one decoded signal quality estimator, when in a mode according to said second rate-set and for routing said encoded signal frame to said first of said at least one decoders, when in a mode according to said first rate-set, wherein said controller selects the best of said encoded signal quality values, said decoder decodes said encoded signal frame according to the rate associated with said selected encoded signal quality value, thereby producing a decoded frame, wherein said erasure detection unit provides said decoded frame to said host when determining said decoded frame allowed, and wherein said erasure detection unit rejects said decoded frame otherwise.

11. The rate detection device according to claim 10, wherein each said plurality of encoded signal quality estimators processes said encoded signal frame according to an encoded quality criteria which is selected from the group consisting of:

$$l(data) = c_{rate} + \beta \sum_{j=1}^{N_s/rpt} \log\left(\exp\left\{\frac{2\hat{c}}{\hat{\sigma}^2}si(j)\right\} + \exp\left\{\frac{-2\hat{c}}{\hat{\sigma}^2}si(j)\right\}\right);$$

$$l(data) = c_{rate} + \beta \sum_{j=1}^{N_s/rpt} \log\left(\exp\left\{\frac{2\hat{c}}{\overline{\sigma}^2}si(j)\right\} + \exp\left\{\frac{-2\hat{c}}{\overline{\sigma}^2}si(j)\right\}\right)$$

where $\overline{\sigma_t^2} = \overline{\sigma_{t-1}^2} \cdot \delta + \hat{\sigma}_t^2 \cdot (1-\delta);$ $$l(data) = c_{rate} + \sum_{j=1}^{N_s/rpt} \log\left(\exp\left\{\frac{2\hat{c}\beta}{\overline{\sigma}^2}si(j)\right\} + \exp\left\{\frac{-2\hat{c}\beta}{\overline{\sigma}^2}si(j)\right\}\right);$$

$$l(data) = c_{rate} + \sum_{j=1}^{N_s/rpt} \log\left(\exp\left\{\frac{2\hat{c}\beta}{\overline{\sigma}^2}si(j)\right\} + \exp\left\{\frac{-2\hat{c}\beta}{\overline{\sigma}^2}si(j)\right\}\right)$$

where $\overline{\sigma_t^2} = \overline{\sigma_{t-1}^2} \cdot \delta + \hat{\sigma}_t^2 \cdot (1-\delta);$ $$l(data) = -\beta N_s N_f \log(E_u - \tilde{c}^2 E_p) + c_{rate};$$

$$l(data) = -\beta N_s N_f \log(E_u - \tilde{c}^2 E_p) + c_{rate} + \beta \sum_{j=1}^{N_s/rpt} \log\left(1 + \exp\left\{-\left|\frac{4\tilde{c}}{\hat{\sigma}^2}si(j)\right|\right\}\right);$$

$$l(data_1, data_2) = K_1 - N_s \log 2 / rpt_1 + \sum_{j=1}^{N_s/rpt_1} \log\left(\exp\left\{\frac{2c_1}{\sigma^2}si_1(j)\right\} + \exp\left\{\frac{-2c_1}{\sigma^2}si_1(j)\right\}\right) + K_2 -$$

$$N_s \log 2 / rpt_2 + \sum_{j=1}^{N_s/rpt_2} \log\left(\exp\left\{\frac{2c_2}{\sigma^2}si_2(j)\right\} + \exp\left\{\frac{-2c_2}{\sigma^2}si_2(j)\right\}\right);$$

$$l(data_1, data_2) = K_1 - N_s \log 2 / rpt_1 + \frac{2c_1}{\sigma^2}\sum_{j=1}^{N_s/rpt_1}|si_1(j)| +$$

$$K_2 - N_s \log 2 / rpt_2 + \frac{2c_2}{\sigma^2}\sum_{j=1}^{N_s/rpt_2}|si_2(j)|;$$

$$\tilde{c}_1 = \frac{\sum_{j=1}^{N_s/rpt_1}|si_1(j)| + \gamma\sum_{j=1}^{N_s/rpt_2}|si_2(j)|}{E_{p_1} + \gamma^2 E_{p_2}};$$

$$\tilde{\sigma} = \sqrt{\frac{1}{2N_s N_f}\left[E_{u_1} + E_{u_2} - (E_{p_1} + \gamma^2 E_{p_2})\tilde{c}_1^2\right]};$$

$$l(data_1, data_2) = -2N_s N_f \log\left[E_{u_1} + E_{u_2} - \tilde{c}_1^2(E_{p_1} + \gamma^2 E_{p_2})\right] - \frac{N_s}{rpt_1}\log 2 - \frac{N_s}{rpt_2}\log 2;$$

$$l(data_1, data_2) = -\beta N_s N_f \log\left[E_{u_1} + E_{u_2} - \tilde{c}_1^2(E_{p_1} + \gamma^2 E_{p_2})\right] + c_{rate_1} + c_{rate_2};$$

$$l(data_1, data_2) = -\beta N_s N_f \log\left[E_{u_1} + E_{u_2} - \tilde{c}_1^2(E_{p_1} + \gamma^2 E_{p_2})\right] +$$

$$c_{rate_1} + c_{rate_2} + \beta \sum_{j=1}^{N_s/rpt} \log\left(1 + \exp\left\{-\left|\frac{4\tilde{c}_1}{\overline{\sigma}^2}si_1(j)\right|\right\}\right) +$$

$$\beta \sum_{j=1}^{N_s/rpt} \log\left(1 + \exp\left\{-\left|\frac{4\tilde{c}_2}{\overline{\sigma}^2}si_2(j)\right|\right\}\right); \text{ and}$$

$$a_j = \max_i \{\rho \hat{a}_i + (1-\rho)l_{ij}(data)\}.$$

12. The rate detection device according to claim 9, wherein the successes and failure of each said decoders, to decode said encoded signal frame is determined according to an erasure detection criteria.

13. In a receiver receiving an encoded signal frame, the encoded signal frame being encoded in a plurality of rates, a rate detection device comprising:

a plurality of encoded signal quality estimators each having a different one of said plurality of rates associated therewith, wherein each estimator processes said encoded signal frame according to its associated rate, thereby producing a quality value for said associated rate;

a controller connected to said plurality of encoded signal quality estimators, wherein said controller selects the rate having the best quality value and provides said selected rate to said receiver, wherein each said plurality of encoded signal quality estimators processes said encoded signal frame according to an encoded quality criteria which is selected from the group consisting of:

$$l(data) = c_{rate} + \beta \sum_{j=1}^{N_s/rpt} \log\left(\exp\left\{\frac{2\hat{c}}{\hat{\sigma}^2}si(j)\right\} + \exp\left\{\frac{-2\hat{c}}{\hat{\sigma}^2}si(j)\right\}\right);$$

$$l(data) = c_{rate} + \beta \sum_{j=1}^{N_s/rpt} \log\left(\exp\left\{\frac{2\hat{c}}{\overline{\sigma}^2}si(j)\right\} + \exp\left\{\frac{-2\hat{c}}{\overline{\sigma}^2}si(j)\right\}\right)$$

where $\overline{\sigma_t^2} = \overline{\sigma_{t-1}^2} \cdot \delta + \hat{\sigma}_t^2 \cdot (1-\delta);$ $$l(data) = c_{rate} + \sum_{j=1}^{N_s/rpt} \log\left(\exp\left\{\frac{2\hat{c}\beta}{\overline{\sigma}^2}si(j)\right\} + \exp\left\{\frac{-2\hat{c}\beta}{\overline{\sigma}^2}si(j)\right\}\right);$$

$$l(data) = c_{rate} + \sum_{j=1}^{N_s/rpt} \log\left(\exp\left\{\frac{2\hat{c}\beta}{\overline{\sigma}^2}si(j)\right\} + \exp\left\{\frac{-2\hat{c}\beta}{\overline{\sigma}^2}si(j)\right\}\right)$$

where $\overline{\sigma_t^2} = \overline{\sigma_{t-1}^2} \cdot \delta + \hat{\sigma}_t^2 \cdot (1-\delta);$ $$l(data) = -\beta N_s N_f \log(E_u - \tilde{c}^2 E_p) + c_{rate};$$

$$l(data) = -\beta N_s N_f \log(E_u - \tilde{c}^2 E_p) + c_{rate} + \beta \sum_{j=1}^{N_s/rpt} \log\left(1 + \exp\left\{-\left|\frac{4\tilde{c}}{\hat{\sigma}^2}si(j)\right|\right\}\right);$$

$$l(data_1, data_2) = K_1 - N_s \log 2 / rpt_1 + \sum_{j=1}^{N_s/rpt_1} \log\left(\exp\left\{\frac{2c_1}{\sigma^2}si_1(j)\right\} + \exp\left\{\frac{-2c_1}{\sigma^2}si_1(j)\right\}\right) + K_2 -$$

$$N_s \log 2 / rpt_2 + \sum_{j=1}^{N_s/rpt_2} \log\left(\exp\left\{\frac{2c_2}{\sigma^2}si_2(j)\right\} + \exp\left\{\frac{-2c_2}{\sigma^2}si_2(j)\right\}\right);$$

-continued $$l(data_1, data_2) = K_1 - N_s \log 2 / rpt_1 + \frac{2c_1}{\sigma^2} \sum_{j=1}^{N_s/rpt_1} |si_1(j)| +$$

$$K_2 - N_s \log 2 / rpt_2 + \frac{2c_2}{\sigma^2} \sum_{j=1}^{N_s/rpt_2} |si_2(j)|;$$

$$\breve{c}_1 = \frac{\sum_{j=1}^{N_s/rpt_1} |si_1(j)| + \gamma \sum_{j=1}^{N_s/rpt_2} |si_2(j)|}{E_{p_1} + \gamma^2 E_{p_2}};$$

$$\breve{\sigma} = \sqrt{\frac{1}{2N_s N_f} \left[ E_{u_1} + E_{u_2} - (E_{p_1} + \gamma^2 E_{p_2}) \breve{c}_1^2 \right]};$$

$$l(data_1, data_2) =$$
$$-2N_s N_f \log [E_{u_1} + E_{u_2} - \breve{c}_1^2 (E_{p_1} + \gamma^2 E_{p_2})] - \frac{N_s}{rpt_1} \log 2 - \frac{N_s}{rpt_2} \log 2;$$

$$l(data_1, data_2) =$$
$$-\beta N_s N_f \log [E_{u_1} + E_{u_2} - \breve{c}_1^2 (E_{p_1} + \gamma^2 E_{p_2})] + c_{rate_1} + c_{rate_2};$$

$$l(data_1, data_2) = -\beta N_s N_f \log [E_{u_1} + E_{u_2} - \breve{c}_1^2 (E_{p_1} + \gamma^2 E_{p_2})] +$$

$$c_{rate_1} + c_{rate_2} + \beta \sum_{j=1}^{N_s/rpt} \log \left( 1 + \exp \left\{ - \left| \frac{4\breve{c}_1}{\breve{\sigma}^2} si_1(j) \right| \right\} \right) +$$

$$\beta \sum_{j=1}^{N_s/rpt} \log \left( 1 + \exp \left\{ - \left| \frac{4\breve{c}_2}{\breve{\sigma}^2} si_2(j) \right| \right\} \right); \text{ and}$$

$$a_j = \max_i \{ \rho \hat{a}_i + (1 - \rho) l_{ij}(data) \}.$$

14. In a communication system, wherein each transmitted signal frame is encoded in one of a plurality of rates, thereby producing an encoded frame, a method for detecting said rate, the method comprising the steps of:
  processing said encoded signal according to at least two of said plurality of rates, thereby producing an encoded signal quality value for each of said rates;
  selecting the best of said encoded signal quality values;
  selecting the rate associated with said selected encoded signal quality value;
  decoding said encoded frame according to said selected rate, thereby producing a decoded frame;
  processing said decoded frame according to a predetermined erasure criteria, thereby determining said decoded frame either as allowed or as rejected;
  selecting the next best of said encoded signal quality values, when rejecting said decoded frame;
  selecting the rate associated with said selected next best encoded signal quality value; and
  repeating from said step of decoding said encoded frame according to said selected rate.

15. In a communication system, wherein each transmitted signal frame is encoded in one of a plurality of rates, thereby producing an encoded frame, a method for detecting said rate, the method comprising the steps of:
  processing said encoded frame at an elected rate of said plurality of rates, thereby producing a decoded signal rate quality value,
  repeating said step of processing for another elected one of said plurality of rates, when railing to correctly decode said encoded frame or when said quality value does not exceed a predetermined threshold value,
  processing said encoded signal according to a plurality of rates, thereby producing an encoded signal quality value for each of said rates, when failing to correctly decode said encoded frame at selected rates of said plurality of rates,
  selecting the best of said encoded signal quality values, and
  selecting the rate associated with said selected encoded signal quality value.

16. The method according to claim 15, wherein each said encoded signal quality value is calculated according to a quality criteria, selected from the group consisting of:

$$l(data) = c_{rate} + \beta \sum_{j=1}^{N_s/rpt} \log \left( \exp \left\{ \frac{2\hat{c}}{\hat{\sigma}^2} si(j) \right\} + \exp \left\{ \frac{-2\hat{c}}{\hat{\sigma}^2} si(j) \right\} \right);$$

$$l(data) = c_{rate} + \beta \sum_{j=1}^{N_s/rpt} \log \left( \exp \left\{ \frac{2\hat{c}}{\overline{\sigma}^2} si(j) \right\} + \exp \left\{ \frac{-2\hat{c}}{\overline{\sigma}^2} si(j) \right\} \right)$$

where $\overline{\sigma_t^2} = \overline{\sigma_{t-1}^2} \cdot \delta + \hat{\sigma}_t^2 \cdot (1 - \delta);$ $$l(data) = c_{rate} + \sum_{j=1}^{N_s/rpt} \log \left( \exp \left\{ \frac{2\hat{c}\beta}{\hat{\sigma}^2} si(j) \right\} + \exp \left\{ \frac{-2\hat{c}\beta}{\hat{\sigma}^2} si(j) \right\} \right);$$

$$l(data) = c_{rate} + \sum_{j=1}^{N_s/rpt} \log \left( \exp \left\{ \frac{2\hat{c}\beta}{\overline{\sigma}^2} si(j) \right\} + \exp \left\{ \frac{-2\hat{c}\beta}{\overline{\sigma}^2} si(j) \right\} \right)$$

where $\overline{\sigma_t^2} = \overline{\sigma_{t-1}^2} \cdot \delta + \hat{\sigma}_t^2 \cdot (1 - \delta);$ $$l(data) = -\beta N_s N_f \log(E_u - \breve{c}^2 E_p) + c_{rate};$$

$$l(data) =$$
$$-\beta N_s N_f \log(E_u - \breve{c}^2 E_p) + c_{rate} + \beta \sum_{j=1}^{N_s/rpt} \log \left( 1 + \exp \left\{ - \left| \frac{4\breve{c}}{\hat{\sigma}^2} si(j) \right| \right\} \right);$$

$$l(data_1, data_2) = K_1 - N_s \log 2 / rpt_1 +$$
$$\sum_{j=1}^{N_s/rpt_1} \log \left( \exp \left\{ \frac{2c_1}{\sigma^2} si_1(j) \right\} + \exp \left\{ \frac{-2c_1}{\sigma^2} si_1(j) \right\} \right) + K_2 -$$
$$N_s \log 2 / rpt_2 + \sum_{j=1}^{N_s/rpt_2} \log \left( \exp \left\{ \frac{2c_2}{\sigma^2} si_2(j) \right\} + \exp \left\{ \frac{-2c_2}{\sigma^2} si_2(j) \right\} \right);$$

$$l(data_1, data_2) = K_1 - N_s \log 2 / rpt_1 + \frac{2c_1}{\sigma^2} \sum_{j=1}^{N_s/rpt_1} |si_1(j)| +$$

$$K_2 - N_s \log 2 / rpt_2 + \frac{2c_2}{\sigma^2} \sum_{j=1}^{N_s/rpt_2} |si_2(j)|;$$

$$\breve{c}_1 = \frac{\sum_{j=1}^{N_s/rpt_1} |si_1(j)| + \gamma \sum_{j=1}^{N_s/rpt_2} |si_2(j)|}{E_{p_1} + \gamma^2 E_{p_2}};$$

$$\breve{\sigma} = \sqrt{\frac{1}{2N_s N_f} \left[ E_{u_1} + E_{u_2} - (E_{p_1} + \gamma^2 E_{p_2}) \breve{c}_1^2 \right]};$$

$$l(data_1, data_2) =$$
$$-2N_s N_f \log [E_{u_1} + E_{u_2} - \breve{c}_1^2 (E_{p_1} + \gamma^2 E_{p_2})] - \frac{N_s}{rpt_1} \log 2 - \frac{N_s}{rpt_2} \log 2;$$

-continued $$l(data_1, data_2) =$$
$$-\beta N_s N_f \log[E_{u_1} + E_{u_2} - \breve{c}_1^2(E_{p_1} + \gamma^2 E_{p_2})] + c_{rate_1} + c_{rate_2};$$

$$l(data_1, data_2) = -\beta N_s N_f \log[E_{u_1} + E_{u_2} - \breve{c}_1^2(E_{p_1} + \gamma^2 E_{p_2})] +$$

$$c_{rate_1} + c_{rate_2} + \beta \sum_{j=1}^{N_s/rpt} \log\left(1 + \exp\left\{-\left|\frac{4\breve{c}_1}{\breve{\sigma}^2} si_1(j)\right|\right\}\right) +$$

$$\beta \sum_{j=1}^{N_s/rpt} \log\left(1 + \exp\left\{-\left|\frac{4\breve{c}_2}{\breve{\sigma}^2} si_2(j)\right|\right\}\right); \text{ and}$$

$$a_j = \max_i \{\rho \hat{a}_i + (1-\rho) l_{ij}(data)\}.$$

17. The method according to claim 15, further comprising the steps of:
  decoding said encoded frame according to said selected rate, thereby producing a decoded frame, and
  processing said decoded frame according to a predetermined erasure criteria, thereby determining said decoded frame either as allowed or as rejected.

18. The method according to claim 17, further comprising the steps of:
  selecting the next best of said encoded signal quality values, when rejecting said decoded frame,
  selecting the rate associated with said selected next best encoded signal quality value, and
  repeating from said step of decoding said encoded frame according to said selected rate.

19. In a communication system, wherein each transmitted signal frame is encoded in an elected one of a plurality of rates, thereby producing an encoded frame, the transmitted signal frame including user data, the user data being encoded in the encoded frame at a power level which is associated with the elected rate, a method for detecting the elected rate, the method comprising the steps of:
  analyzing the encoded frame at a plurality of rates, thereby producing user data power associated quality values therefrom,
  selecting the best of said user data power associated quality values, and
  selecting the rate associated with said selected user data power associated quality value,
  wherein said step of analyzing further includes comparing the user data power of said encoded frame with user data power of previous analyzed frames.

20. The method according to claim 19, wherein said step of analyzing further includes comparing the user data power of said encoded frame with user data power of previous analyzed frames, with respect to the rate determined for said previous analyzed frame.

21. In a communication system, wherein each transmitted signal frame is encoded in an elected one of a plurality of rates, thereby producing an encoded frame, the transmitted signal frame including user data, the user data being encoded in the encoded frame at a power level which is associated with the elected rate, a method for detecting the elected rate, the method comprising the steps of:
  analyzing the encoded frame at a plurality of rates, thereby producing user data power associated quality values therefrom,
  selecting the best of said user data power associated quality values,
  selecting the rate associated with said selected user data power associated quality value,
  decoding said encoded frame according to said selected rate, thereby producing a decoded frame,
  processing said decoded frame according to a predetermined erasure criteria, thereby determining said decoded frame either as allowed or as rejected,
  selecting the next best of said encoded signal quality values, when rejecting said decoded frame,
  selecting the rate associate with said selected next best encoded signal quality value, and
  repeating said step of decoding said encoded frame according to said selected rate.

22. In a communication system, wherein each transmitted signal frame is encoded in one of a plurality of rates, thereby producing an encoded frame, a method for detecting said rate, the method comprising the steps of:
  processing said encoded signal according to at least two of said plurality of rates, thereby producing an encoded signal quality value for each of said rates;
  selecting the best of said encoded signal quality values; and
  selecting the rate associated with said selected encoded signal quality value;
  wherein each said encoded signal quality value is calculated according to a quality criteria, selected from the group consisting of:

$$l(data) = c_{rate} + \beta \sum_{j=1}^{N_s/rpt} \log\left(\exp\left\{\frac{2\hat{c}}{\hat{\sigma}^2} si(j)\right\} + \exp\left\{\frac{-2\hat{c}}{\hat{\sigma}^2} si(j)\right\}\right);$$

$$l(data) = c_{rate} + \beta \sum_{j=1}^{N_s/rpt} \log\left(\exp\left\{\frac{2\hat{c}}{\overline{\sigma}^2} si(j)\right\} + \exp\left\{\frac{-2\hat{c}}{\overline{\sigma}^2} si(j)\right\}\right)$$

where $\overline{\sigma}_t^2 = \overline{\sigma}_{t-1}^2 \cdot \delta + \hat{\sigma}_t^2 \cdot (1-\delta);$ $$l(data) = c_{rate} + \sum_{j=1}^{N_s/rpt} \log\left(\exp\left\{\frac{2\hat{c}\beta}{\hat{\sigma}^2} si(j)\right\} + \exp\left\{\frac{-2\hat{c}\beta}{\hat{\sigma}^2} si(j)\right\}\right);$$

$$l(data) = c_{rate} + \sum_{j=1}^{N_s/rpt} \log\left(\exp\left\{\frac{2\hat{c}\beta}{\overline{\sigma}^2} si(j)\right\} + \exp\left\{\frac{-2\hat{c}\beta}{\overline{\sigma}^2} si(j)\right\}\right)$$

where $\overline{\sigma}_t^2 = \overline{\sigma}_{t-1}^2 \cdot \delta + \hat{\sigma}_t^2 \cdot (1-\delta);$ $$l(data) = -\beta N_s N_f \log(E_u - \hat{c}^2 E_p) + c_{rate};$$

$$l(data) =$$
$$-\beta N_s N_f \log(E_u - \hat{c}^2 E_p) + c_{rate} + \beta \sum_{j=1}^{N_s/rpt} \log\left(1 + \exp\left\{-\left|\frac{4\hat{c}}{\hat{\sigma}^2} si(j)\right|\right\}\right);$$

$$l(data_1, data_2) = K_1 - N_s \log 2/rpt_1 +$$
$$\sum_{j=1}^{N_s/rpt_1} \log\left(\exp\left\{\frac{2c_1}{\sigma^2} si_1(j)\right\} + \exp\left\{\frac{-2c_1}{\sigma^2} si_1(j)\right\}\right) + K_2 -$$
$$N_s \log 2/rpt_2 + \sum_{j=1}^{N_s/rpt_2} \log\left(\exp\left\{\frac{2c_2}{\sigma^2} si_2(j)\right\} + \exp\left\{\frac{-2c_2}{\sigma^2} si_2(j)\right\}\right);$$

-continued $$l(data_1, data_2) = K_1 - N_s \log 2 / rpt_1 + \frac{2c_1}{\sigma^2} \sum_{j=1}^{N_s/rpt_1} |si_1(j)| +$$

$$K_2 - N_s \log 2 / rpt_2 + \frac{2c_2}{\sigma^2} \sum_{j=1}^{N_s/rpt_2} |si_2(j)|;$$

$$\breve{c}_1 = \frac{\sum_{j=1}^{N_s/rpt_1} |si_1(j)| + \gamma \sum_{j=1}^{N_s/rpt_2} |si_2(j)|}{E_{p_1} + \gamma^2 E_{p_2}};$$

$$\breve{\sigma} = \sqrt{\frac{1}{2N_s N_f} \left[ E_{u_1} + E_{u_2} - (E_{p_1} + \gamma^2 E_{p_2})\breve{c}_1^2 \right]};$$

$$l(data_1, data_2) =$$
$$-2N_s N_f \log\left[ E_{u_1} + E_{u_2} - \breve{c}_1^2 (E_{p_1} + \gamma^2 E_{p_2}) \right] - \frac{N_s}{rpt_1} \log 2 - \frac{N_s}{rpt_2} \log 2;$$

$$l(data_1, data_2) =$$
$$-\beta N_s N_f \log\left[ E_{u_1} + E_{u_2} - \breve{c}_1^2 (E_{p_1} + \gamma^2 E_{p_2}) \right] + c_{rate_1} + c_{rate_2};$$

$$l(data_1, data_2) = -\beta N_s N_f \log\left[ E_{u_1} + E_{u_2} - \breve{c}_1^2 (E_{p_1} + \gamma^2 E_{p_2}) \right] +$$

$$c_{rate_1} + c_{rate_2} + \beta \sum_{j=1}^{N_s/rpt} \log\left(1 + \exp\left\{-\left|\frac{4\breve{c}_1}{\breve{\sigma}^2} si_1(j)\right|\right\}\right) +$$

$$\beta \sum_{j=1}^{N_s/rpt} \log\left(1 + \exp\left\{-\left|\frac{4\breve{c}_2}{\breve{\sigma}^2} si_2(j)\right|\right\}\right); \text{ and}$$

$$a_j = \max_i \{\rho \hat{a}_i + (1-\rho) l_{ij}(data)\}.$$

23. In a communication system, wherein each transmitted signal frame is encoded in one of a plurality of rates, thereby producing an encoded frame, a method for detecting said rate, the method of comprising the steps of:
  processing said encoded frame at an elected rate of said plurality of rates, thereby producing a decoded signal rate quality value,
  repeating said step of processing for another elected one of said plurality of rates, when failing to correctly decode said encoded frame or when said quality value does not exceed a predetermined threshold value,
  wherein said failing to correctly decode said encoded frame is determined according to an erasure criteria.

24. The method according to claim 15, wherein said failing to correctly decode said encoded frame is determined according to an erasure criteria.

25. In a communication system, wherein each transmitted signal frame is encoded in an elected one of a plurality of rates, thereby producing an encoded frame, the transmitted signal frame including user data, the user data being encoded in the encoded frame at a power level which is associated with the elected rate, a method for detecting the elected rate, the method comprising the steps of:

analyzing the encoded frame at a plurality of rates, thereby producing user data power associated quality values therefrom,
  selecting the best of said user data power associated quality values, and
  selecting the rate associated with said selected user data power associated quality value,
  wherein said user data power associated quality value is calculated according to a quality criteria, selected from the group consisting of:

$$l(data_1, data_2) =$$
$$K_1 - N_s \log 2 / rpt_1 + \sum_{j=1}^{N_s/rpt_1} \log\left(\exp\left\{\frac{2c_1}{\sigma^2} si_1(j)\right\} + \exp\left\{\frac{-2c_1}{\sigma^2} si_1(j)\right\}\right) +$$

$$K_2 - N_s \log 2 / rpt_2 + \sum_{j=1}^{N_s/rpt_2} \log\left(\exp\left\{\frac{2c_2}{\sigma^2} si_2(j)\right\} + \exp\left\{\frac{-2c_2}{\sigma^2} si_2(j)\right\}\right);$$

$$l(data_1, data_2) = K_1 - N_s \log 2 / rpt_1 + \frac{2c_1}{\sigma^2} \sum_{j=1}^{N_s/rpt_1} |si_1(j)| +$$

$$K_2 - N_s \log 2 / rpt_2 + \frac{2c_2}{\sigma^2} \sum_{j=1}^{N_s/rpt_2} |si_2(j)|;$$

$$\breve{c}_1 = \frac{\sum_{j=1}^{N_s/rpt_1} |si_1(j)| + \gamma \sum_{j=1}^{N_s/rpt_2} |si_2(j)|}{E_{p_1} + \gamma^2 E_{p_2}};$$

$$\breve{\sigma} = \sqrt{\frac{1}{2N_s N_f} \left[ E_{u_1} + E_{u_2} - (E_{p_1} + \gamma^2 E_{p_2})\breve{c}_1^2 \right]};$$

$$l(data_1, data_2) =$$
$$-2N_s N_f \log\left[ E_{u_1} + E_{u_2} - \breve{c}_1^2 (E_{p_1} + \gamma^2 E_{p_2}) \right] - \frac{N_s}{rpt_1} \log 2 - \frac{N_s}{rpt_2} \log 2;$$

$$l(data_1, data_2) =$$
$$-\beta N_s N_f \log\left[ E_{u_1} + E_{u_2} - \breve{c}_1^2 (E_{p_1} + \gamma^2 E_{p_2}) \right] + c_{rate_1} + c_{rate_2};$$

$$l(data_1, data_2) = -\beta N_s N_f \log\left[ E_{u_1} + E_{u_2} - \breve{c}_1^2 (E_{p_1} + \gamma^2 E_{p_2}) \right] +$$

$$c_{rate_1} + c_{rate_2} + \beta \sum_{j=1}^{N_s/rpt} \log\left(1 + \exp\left\{-\left|\frac{4\breve{c}_1}{\breve{\sigma}^2} si_1(j)\right|\right\}\right) +$$

$$\beta \sum_{j=1}^{N_s/rpt} \log\left(1 + \exp\left\{-\left|\frac{4\breve{c}_2}{\breve{\sigma}^2} si_2(j)\right|\right\}\right); \text{ and}$$

$$a_j = \max_i \{\rho \hat{a}_i + (1-\rho) l_{ij}(data)\}.$$

* * * * *

UNITED STATES PATENT AND TRADEMARK OFFICE
CERTIFICATE OF CORRECTION

PATENT NO. : 6,112,325
DATED : August 29, 2000
INVENTOR(S) : Burshtein, David

It is certified that error appears in the above-identified patent and that said Letters Patent is hereby corrected as shown below:

Column 25,
Line 34, instead of "and" correct to -- said --

Column 30,
Line 15, instead of "in a" correct to -- in one of a --

Column 31,
Line 65, instead of "railing" correct to -- failing --

Signed and Sealed this

Thirtieth Day of July, 2002

Attest:

JAMES E. ROGAN
Attesting Officer          Director of the United States Patent and Trademark Office